United States Patent [19]
Iwata et al.

[11] Patent Number: 5,586,954
[45] Date of Patent: Dec. 24, 1996

[54] CONTROL SYSTEM FOR AUTOMATIC TRANSMISSION

[75] Inventors: Akihito Iwata, Hekinan; Kazumasa Tsukamoto, Toyota; Kazuhiro Mikami, Kariya; Masahiro Hayabuchi, Anjo; Yoshihisa Yamamoto, Nishio, all of Japan

[73] Assignee: Aisin AW Co., Ltd., Japan

[21] Appl. No.: 551,227

[22] Filed: Oct. 31, 1995

[30] Foreign Application Priority Data

Oct. 31, 1994 [JP] Japan .................................. 6-290570

[51] Int. Cl.$^6$ .................................................. F16H 61/20
[52] U.S. Cl. ........................................... 477/93; 477/114
[58] Field of Search .................................... 477/93, 114

[56] References Cited

U.S. PATENT DOCUMENTS

| | | | |
|---|---|---|---|
| 4,644,826 | 2/1987 | Kubo et al. | 74/866 |
| 4,648,289 | 3/1987 | Kubo et al. | 74/866 |
| 4,840,092 | 6/1989 | Sakaguchi et al. | 477/114 |
| 4,879,925 | 11/1989 | Taga et al. | 74/867 |

*Primary Examiner*—Dirk Wright
*Attorney, Agent, or Firm*—Lorusso & Loud

[57] ABSTRACT

A control system for an automatic transmission, having a fluid transmission unit for transmitting the rotation of an engine to a speed change unit. The control system includes a clutch which is applied responsive to selection of forward running range; a one-way clutch which is locked, when the clutch is applied, to establish a forward first speed; a brake for locking the one-way clutch, to block reverse rotation of the output shaft of the speed change unit. First and second hydraulic servos apply, respectively, the clutch and the brake responsive to receipt of oil pressures. A control unit controls the oil pressures fed to the first and second hydraulic servos. The control unit starts the feed of oil pressure to the second hydraulic servo responsive to selection of a forward running range, provided the vehicle is substantially stopped, the engine is idling and the foot brake is engaged. The control unit starts the reduction of the pressure of the first hydraulic servo upon expiration of a set time period and starts transition of the clutch from the applied state to the slipping state of the clutch upon completion of the piston stroke of the second hydraulic servo which applies the brake.

16 Claims, 16 Drawing Sheets

| | | SOLENOID | | | CLUTCH | | | BRAKE | | | | ONE-WAY CLUTCH | | |
|---|---|---|---|---|---|---|---|---|---|---|---|---|---|---|
| | | S1 | S2 | S3 | C1 | C2 | C3 | B1 | B2 | B3 | B4 | F1 | F2 | F3 |
| R | | × | ○ | × | × | ○ | × | × | × | ○ | ○ | × | × | × |
| N | | × | ○ | × | × | × | × | × | × | × | ○ | × | × | × |
| D | 1 ST | × | ○ | △ | ○ | × | × | × | × | (○) | ○ | × | ○ | ○ |
| | 2 ND | ○ | ○ | △ | ○ | × | × | ○ | ○ | × | ○ | ○ | × | ○ |
| | 3 RD | ○ | × | × | ○ | × | ○ | ○ | ○ | × | × | ○ | × | × |
| | 4 TH | × | × | × | ○ | ○ | ○ | × | ○ | × | × | × | × | × |

CONTROL SYSTEM FOR AUTOMATIC TRANSMISSION

BACKGROUND OF THE INVENTION

The present invention relates to a control system for an automatic transmission.

A typical prior art automatic transmission includes a torque converter acting as a fluid transmission unit for receiving the rotation generated by the engine and a speed change unit for changing the speed of the rotation transmitted from the torque converter. The speed change unit includes a planetary gear unit and changes the speed in accordance with the shift pattern which is set in advance according to the vehicle speed, the throttle opening and so on.

The conventional automatic transmission enables selection of ranges including a P (parking) range, a R (reverse) range, a N (neutral) range, a D (drive) range, a S (second) range and a L (low) range. If the range is changed from the N-range to the D-range by the shift lever, for example, the idling rotation of the engine is transmitted through the torque converter to the gear change unit, to cause a creep phenomenon wherein the vehicle inches forward without depression of the accelerator pedal.

Therefore, provision is made for preventing this creep phenomenon by releasing a forward clutch, i.e. a first clutch to be applied in forward running. In the prior art, therefore, the release of the first clutch is effected by reducing the oil pressure of the hydraulic servo of the first clutch when one of the D-range, the S-range and the L-range (hereinafter "forward running range") for moving the vehicle forward is selected but the vehicle is substantially at a stop.

However, if the first clutch is released, the vehicle may roll backward on an uphill grade against the will of the driver. Thus, simultaneously with release of the first clutch, a hill-hold control is effected, e.g. as disclosed in U.S. Pat. No. 4,648,289.

In such a hill-hold control, the shifting brake of the speed change unit is applied to block the backward rotation of the output shaft by the action of a one-way clutch to thereby prevent the vehicle from rolling backward.

In the prior art control system for an automatic transmission, however, for the hill-hold control, the time required for the piston of the hydraulic servo to move to the point of starting application of the brake, after initiation of the feed of the oil pressure to the hydraulic servo, represents a time lag before the hill-hold control becomes actually effective after the start of the application of the brake. This time lag is longer than the time period beginning with the start of the release of the first clutch and ending with lowering of the torque transmission upon start of transition of the first clutch from the applied state to the slipping state. Therefore, if the hill-hold control is started on an uphill road, simultaneously with the establishment of the release of the first clutch, the transition of the first clutch to the slipping state may start before the application of the brake is started to actually effect the hill-hold control, thereby allowing the vehicle to roll backward.

A driver will often reduce pressure on the foot brake as the creeping force acts uphill. Therefore, if the first clutch substantially fails to transmit torque before the hill-hold control becomes effective, the vehicle may possibly move backward a short distance even with maintaining a constant foot braking force. Still worse, if the application of the brake is started to effect the hill-hold control while the vehicle is moving backward, a shock is caused by the application of the brake.

SUMMARY OF THE INVENTION

The present invention has as its objective solution of the above-described problems of the prior art control systems for automatic transmissions and, more specifically, provision of a control system for an automatic transmission which can prevent the vehicle from moving backward due to a delay in application of the hill-hold control and which is unaccompanied by shock.

Accordingly, the present invention provides a control system for an automatic transmission, which control system includes a fluid transmission unit for transmitting the rotation of the engine to the speed change unit; a clutch which is applied responsive to selection of a forward running range; a one-way clutch which becomes locked when the clutch is applied, to establish a forward first speed; a brake for locking the one-way clutch to prevent reverse rotation of the output shaft of the speed change unit; a first hydraulic servo for applying the clutch upon receipt of oil pressure; a second hydraulic servo for applying the brake responsive to receipt of oil pressure; and a control unit for controlling the oil pressures fed to the first hydraulic servo and the second hydraulic servo.

The control unit also includes: oil pressure feed means for feeding oil pressure to the second hydraulic servo responsive to selection of the forward running range, provided the vehicle is substantially stopped, the engine is idling and the foot brake is engaged; and pressure reducing means for initiating bleeding of oil pressure from the first hydraulic servo upon expiration of a set time period to start transition of the clutch from the applied state to a slipping state at or after completion of the piston stroke of the second hydraulic servo whereby the brake is engaged.

In one preferred embodiment the control system includes, as described above, a fluid transmission unit, a clutch, which is responsive to selection of a one-way clutch, a brake, a first hydraulic servo for applying the clutch, a second hydraulic servo for applying the brake and a control unit for controlling the oil pressure fed to the first hydraulic servo and the second hydraulic servo. However, in this first preferred embodiment, the control system further includes a vehicle speed corresponding value sensor for detecting a parameter corresponding to vehicle speed. In such preferred embodiments, the control unit further includes vehicle speed decision means for deciding whether or not the detected value for the parameter corresponding to vehicle speed has reached a set value; deceleration calculation means for calculating the deceleration of the vehicle on the basis of the detected parameter corresponding to vehicle speed prior to reaching the set value; and vehicle stop estimation means for estimating the time for the vehicle to stop on the basis of the calculated deceleration, when it is decided that the value corresponding to vehicle speed has reached the set value. The control unit further includes oil pressure feed means for starting the feed of the oil pressure to the second hydraulic servo at a set timing, responsive to selection of the forward running range, when the engine is idling and the foot brake is engaged, and for ending the piston stroke of the second hydraulic servo at expiration of the time period estimated by the vehicle stop estimation means; and the above-described pressure reducing means.

A second preferred embodiment of the present invention includes both a first brake, for locking the one-way clutch to block reverse rotation of the output shaft of the speed change unit and for engaging a speed change member at 2nd forward and higher gear stages, and a second brake, arranged in parallel with the first brake, for engaging that speed change member through a second one-way clutch. This second embodiment of the control system further includes a third hydraulic servo for applying the second brake responsive to receipt of oil pressure and the above-described sensor which detects a parameter corresponding to the vehicle speed. In this second embodiment, the control unit includes the above-described vehicle speed decision means, deceleration calculation means, vehicle stop estimation means, oil pressure feed means and pressure reducing means. In this second preferred embodiment the oil pressure feed means also feeds oil pressure to the third hydraulic servo at a set timing, responsive to selection of the forward running range, if the engine is idling and if the foot brake is engaged, and ends the piston stroke of the third hydraulic servo upon expiration of the time period estimated by the vehicle stop estimation means. Additionally, the control unit of this second embodiment includes a sequence valve which is switched, responsive to a rise in the oil pressure to the third hydraulic servo, for starting the feed of the oil pressure to the second hydraulic servo upon completion of the piston stroke of the third hydraulic servo.

By applying the first brake and the second brake the first one-way clutch is locked to block the backward rotation of the output shaft of the speed change unit.

The pressure reduction of the first hydraulic servo is started at a set time to end the piston strokes of the second hydraulic servo and the third hydraulic servo and to start the applications of the first brake and the second brake. Further, the transition of the clutch from the applied state to the slipping state is started at or after engagement of the first brake and the second brake is initiated. As a result, if release of the first clutch and the hill-hold control are simultaneously started on an uphill incline, the transition of the clutch to the slipping state is not started until the applications of the first brake and the second brake are started to actually effect the hill-hold control, so that the vehicle can be prevented from rolling backward. Accordingly, the first brake and the second brake are not engaged to effect hill-hold control during the backward movement of the vehicle, whereby shock is prevented.

Moreover, since the time required for the vehicle to stop is estimated on the basis of the detected deceleration, the first brake and the second brake are not applied during the running of the vehicle even if the deceleration of the vehicle fluctuates, so that shock due to a shift to another gear stage can be prevented. Moreover, application of the first brake and the second brake can be started as soon as possible so that the start of transition of the clutch to the slipping state can be accordingly advanced. This allows for a reduction in fuel consumption and vibration suppression due to the released state of the first clutch.

A third preferred embodiment of the present invention includes the above-described fluid transmission unit, clutch, first one-way clutch for establishing a forward first speed, first brake, second brake, first hydraulic servo, second hydraulic servo, third hydraulic servo, vehicle speed corresponding value sensor and control unit. Likewise, the control unit includes the above-described vehicle speed decision means, deceleration calculation means, vehicle stop estimation means, oil pressure feed means and pressure reducing means.

However, in this third preferred embodiment, the oil pressure feed means feeds oil pressures to both the second hydraulic servo and the third hydraulic servo at a set timing, provided the forward running range is selected, the engine is idling and the foot brake is engaged, to end the piston strokes of the second hydraulic servo and the third hydraulic servo upon expiration of the time period estimated by the vehicle stop estimation means. The pressure reducing means starts the reduction of pressure in the first hydraulic servo at a set timing, thereby starting transition of the clutch to the slipping state upon completion of the piston strokes of the second hydraulic servo and the third hydraulic servo, so that the applications of the first brake and the second brake have already started.

In the foregoing embodiments, when the clutch is applied by feeding oil pressure to the first hydraulic servo, the rotation of the engine is transmitted through the fluid transmission unit to the speed change unit so that the one-way clutch is locked to establish the forward 1st speed. On the other hand, when the oil pressure is fed to the second hydraulic servo to apply the brake, the one-way clutch is locked to block the reverse rotation of the output shaft of the speed change unit.

If a forward running range is selected, if the vehicle is substantially stopped, if the engine is idling and if the foot brake is engaged, the feed of the oil pressure to the second hydraulic servo is started by the oil pressure feed means. Likewise, the pressure reducing means starts the reduction of pressure in the first hydraulic servo upon expiration of a set time period and starts the transition of the clutch from applied to slipping at or after completion of the piston stroke of the second hydraulic servo so that the the brake is engaged. As a result, if the release of the first clutch and the hill-hold control are simultaneously started on an uphill incline, the transition of the clutch to the slipping state is not started until the application of the brake is started to actually effect the hill-hold control, so that the vehicle can be prevented from running backward. As a result, the application of the brake is not started during the backward movement of the vehicle, whereby shock is prevented.

If release of the first clutch is delayed, the fuel consumption reduction and the vibration suppression, which accompany release of the first clutch, are accordingly lost to some extent. Accordingly, in the present invention, subsequent to the start of application of the brake, transition of the clutch to the slipping state is started to maximize the fuel consumption reducing effect and the vibration suppressing effect.

When the parameter corresponding to the vehicle speed, as detected by the vehicle speed corresponding value sensor, reaches the set value, the deceleration of the vehicle is calculated on the basis of the detected value before having reached the set value, so that the timing for the vehicle to stop is estimated on the basis of the deceleration.

Moreover, since the timing for stopping the vehicle is estimated on the basis of the deceleration, the brake is not applied during the running of the vehicle, even if the deceleration of the vehicle fluctuates, so that shock due to a shift to another gear stage can be prevented. Moreover, the application of the brake can be started as soon as possible so that the start of the transition of the clutch to the slipping state can be accordingly advanced. This can prevent an increase in the fuel consumption and in vibration due to the release of the first clutch.

DESCRIPTION OF THE PREFERRED EMBODIMENTS

Various embodiments of the present invention will now be described with reference to the accompanying drawings.

Figure 1:
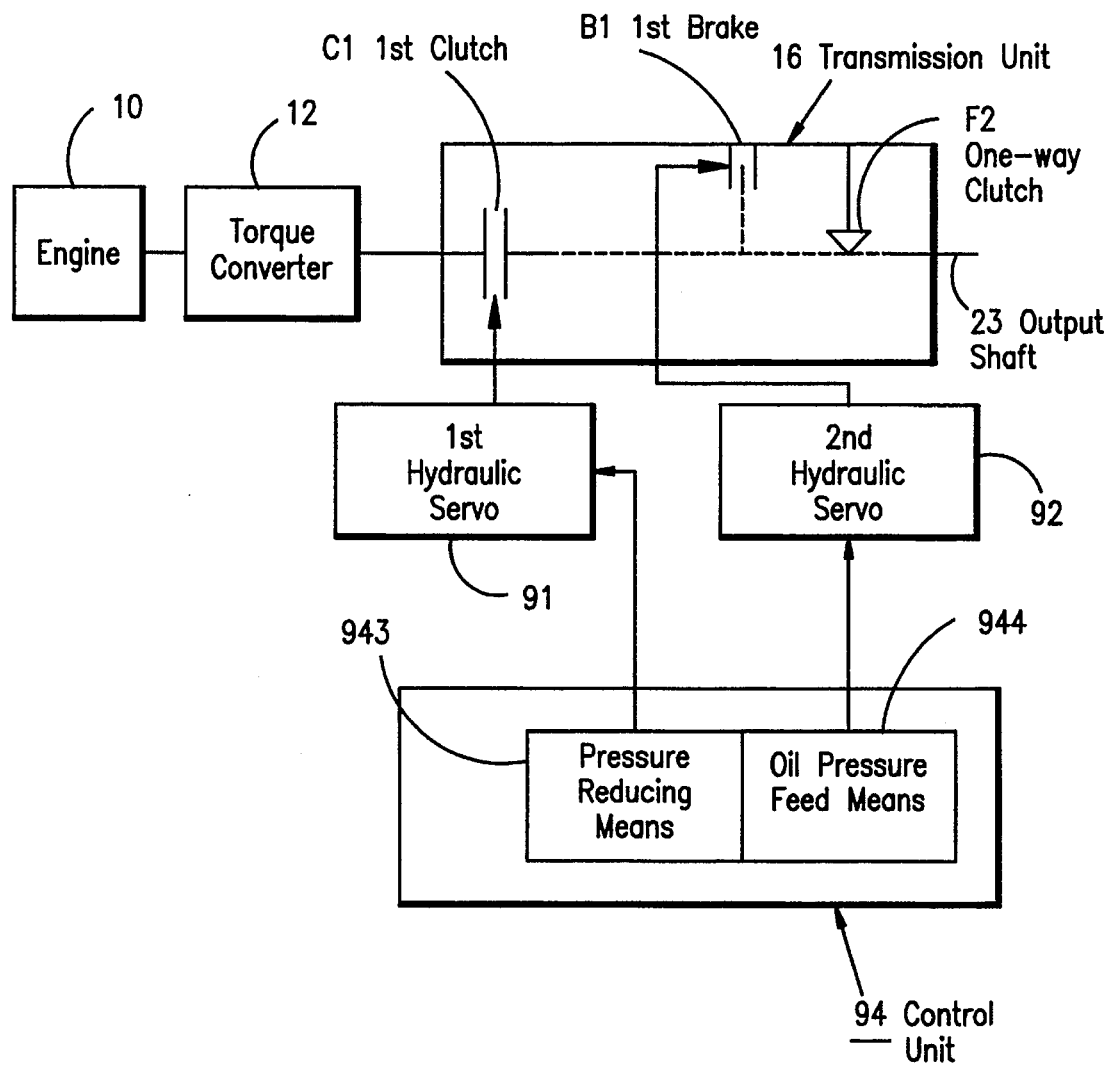
FIG. 1 is a block diagram showing the basic components of a control system for an automatic transmission according to a first embodiment of the present invention.

As shown in FIG. 1, the automatic transmission includes a torque converter 12, acting as a fluid transmission unit, for transmitting the rotation of an engine 10 to a speed change unit 16. A first clutch C1 is engaged responsive to selection of a forward running range and a one-way clutch F2 becomes locked, when the first clutch C1 is applied, to establish one forward speed. A first brake B1 acts as a brake to lock the one-way clutch F2, when applied, against reverse rotation of an output shaft 23 of the speed change unit 16. A first hydraulic servo 91 applies the first clutch C1 responsive to receipt of oil pressure and a second hydraulic servo 92 applies the first brake B1 responsive to receipt of oil pressure. A control unit 94 controls the oil pressures fed to the first hydraulic servo 91 and the second hydraulic servo 92. The control unit 94 includes oil pressure feed means 944 for feeding an oil pressure to the second hydraulic servo 92 responsive to selection of a forward running range, provided the vehicle is substantially stopped, the engine 10 is idling and the foot brake (not shown) is engaged. Control unit 94 also includes pressure reducing means 943 for bleeding the pressure from the first hydraulic servo 91, beginning at a set point in time, to start the transition of the first clutch C1 from applied to slipping upon end of movement of the piston (not shown) of the second hydraulic servo 92, so that application of the first brake B1 is started.

Figure 2:
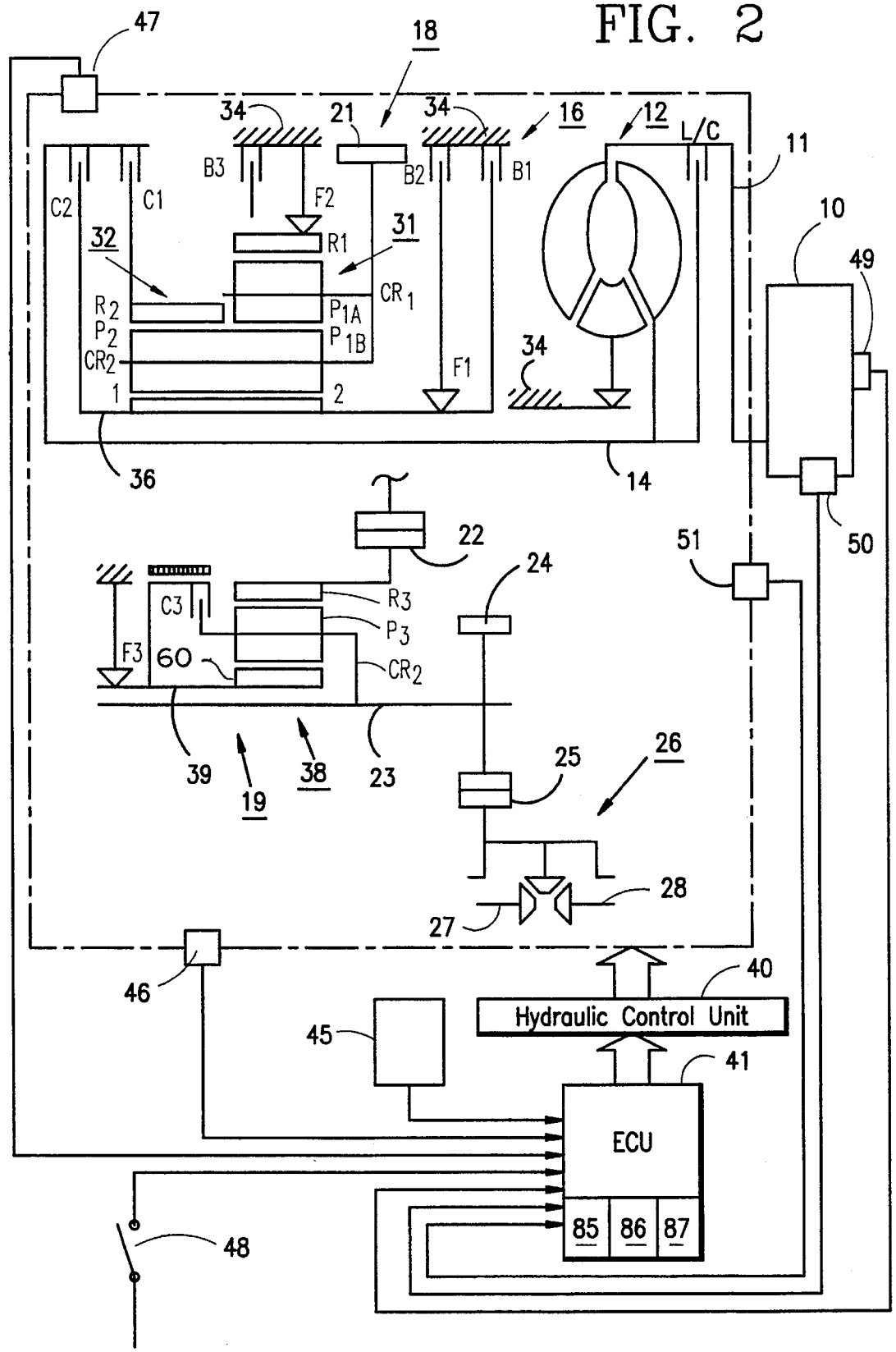
FIG. 2 is a schematic diagram of an automatic transmission controlled according to the first embodiment of the present invention.

As shown in FIG. 2, the rotation of the engine 10 is transmitted through an output shaft 11 to the torque converter 12, acting as the fluid transmission unit. The torque converter 12 transmits the rotation of the engine 10 to an output shaft 14 through a fluid (or working oil). However, if the vehicle speed exceeds a set value, a lockup clutch L/C is applied so that the rotation can be transmitted directly to the output shaft 14.

Output shaft 14 serves as an input to the speed change unit 16 which includes a main transmission 18 for establishing three forward and one reverse gear stages, and an underdrive auxiliary transmission 19. The rotational output of the main transmission 18 is transmitted through a counter drive gear 21 and a counter driven gear 22 to the auxiliary transmission 19 which, in turn, outputs rotation through output shaft 23, an output gear 24 and a ring gear 25 to a differential unit 26.

In differential unit 26, the rotation, as received from the output gear 24 and the ring gear 25, is differentiated so that the differentiated rotations are transmitted through left and right drive shafts 27 and 28 to the drive wheels (not shown).

The main transmission 18 is equipped with a first planetary gear unit 31 and a second planetary gear unit 32 and also a first clutch C1, a second clutch C2, a first brake B1, a second brake B2, a third brake B3, a (second) one-way clutch F1 and a (first) one-way clutch F2, all of which serve to transmit torque selectively between the individual components of the two planetary gear units 31 and 32.

The first planetary gear unit 31 is composed of a ring gear $R_1$ connected to a drive unit case 34 through the third brake B3 and the one-way clutch F2, arranged in parallel; a sun gear 2 formed on a sun gear shaft 36 fitted over and rotatably supported by the outer shaft 14; a carrier $CR_1$ connected to the counter drive gear 21; and pinions $P_{1A}$ and $P_{1B}$ interposed to mesh with each other between the ring gear $R_1$ and the sun gear 2 and rotatably supported by the carrier $CR_1$.

Moreover, the sun gear 2 is connected through the second clutch C2 to the output shaft 14. This sun gear 2 is further connected through the first brake B1 to the drive unit case 34 and through the one-way clutch F1 and the second brake B2, arranged in series, to the drive unit case 34.

On the other hand, the second planetary gear unit 32 is composed of a ring gear $R_2$ connected through the first clutch C1 to the output shaft 14; a sun gear 4 formed on the sun gear shaft 36 integrally with the sun gear 2; a carrier $CR_2$ connected to the carrier $CR_1$; and a pinion $P_2$ interposed to mesh with the ring gear $R_2$ and the sun gear 4, rotatably supported by the carrier $CR_2$ and formed integrally with the pinion $P_{1B}$.

The counter drive gear 21 is in meshing engagement with the counter driven gear 22 in the auxiliary transmission 19, to transmit the rotational output of the main transmission 18 to the auxiliary transmission 19.

The auxiliary transmission 19 includes a third planetary gear unit 38, a third clutch C3, a fourth brake B4 and a one-way clutch F3 for selectively transmitting the torque between the individual components of the third planetary gear unit 38.

The third planetary gear unit 38 is composed of a ring gear $R_3$ connected to the counter driven gear 22; a sun gear 6 formed on a sun gear shaft 39 fitted rotatably on the output shaft 23; a carrier $CR_3$ fixed on the output shaft 23; and a pinion $P_3$ interposed to mesh with the ring gear $R_3$ and the sun gear 6 and rotatably supported by the carrier $CR_3$.

Here will be described the operations of the automatic transmission thus constructed.

Figures 3, 6:
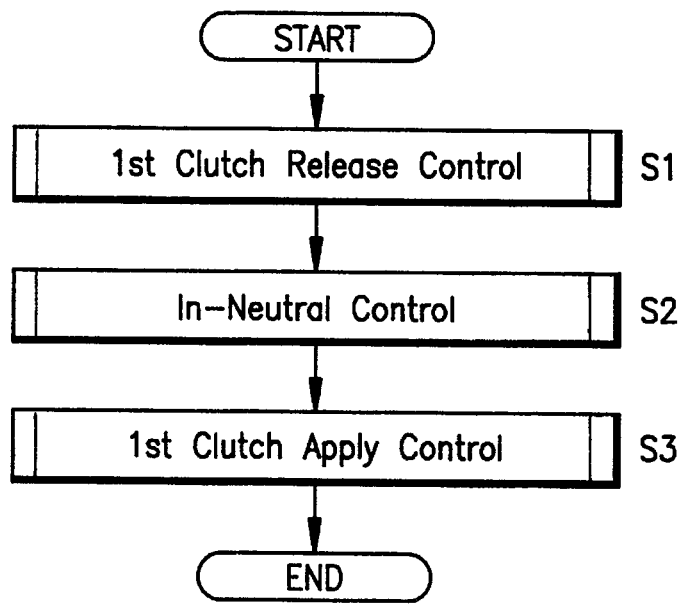
FIG. 3 is a table of the operations of an automatic transmission according to the first embodiment of the present invention.
FIG. 6 is a flow chart of the main routine for operation of the automatic transmission control system according to the first embodiment of the present invention.

In FIG. 3: S1 is the first solenoid valve; S2 is the second solenoid valve; S3 is the third solenoid valve; C1 is the first clutch; C2 is the second clutch; C3 is the third clutch; B1 is the first brake; B2 is the second brake; B3 is the third brake; B4 is the fourth brake; and F1 to F3 are one-way clutches; R represents reverse ("R-range"); N is neutral ("N-range"); D is the drive range; 1ST is a gear stage in 1st speed; 2ND is a gear stage at the 2nd speed; 3RD is a gear stage at the 3rd speed; and 4TH is a gear stage at the 4th speed.

Symbols "o" indicate that a first solenoid signal, a second solenoid signal and a third solenoid signal for opening/closing the first solenoid valve S1, the second solenoid valve S2 and the third solenoid valve S3, respectively, are ON; that the first clutch C1, the second clutch C2, the third clutch C3, the first brake B1, the second brake B2, the third brake B3 and the fourth brake B4 are applied; and that the one-way clutches F1 to F3 are locked. On the other hand, symbols "X" indicate that the first solenoid signal, the second solenoid signal and the third solenoid signal for opening/closing the first solenoid valve S1, the second solenoid valve S2 and the third solenoid valve S3, respectively, are OFF; that the first clutch C1, the second clutch C2, the third clutch C3, the first brake B1, the second brake B2, the third brake B3 and the fourth brake B4 are released; and that the one-way clutches F1 to F3 are free.

Symbols "Δ" indicate the ON/OFF (either ON or OFF) of the third solenoid signal when the neutral control state is established, and a parenthesized circle "(o)" indicates that the third brake B3 is applied for engine braking.

At the 1st speed in the D-range, the first clutch C1 and the fourth brake B4 are applied to lock the one-way clutches F2 and F3. Then, the rotation of the output shaft 14 (FIG. 2) is transmitted through the first clutch C1 to the ring gear $R_2$. In this state, the rotation of the ring gear $R_1$ is blocked by the one-way clutch F2 so that the rotation of the carrier $CR_2$ is drastically decelerated, while idly rotating the sun gear 4, and is transmitted to the counter drive gear 21.

The rotation, as transmitted from the counter drive gear 21 to the counter driven gear 22, is transmitted to the ring gear $R_3$. However, the rotation of the sun gear 6 is blocked by the fourth brake B4 so that the rotation of the carrier $CR_3$ is further decelerated and transmitted to the output shaft 23.

At the 2nd speed in the D-range, on the other hand, the first clutch C1, the first brake B1, the second brake B2 and the fourth brake B4 are applied to lock the one-way clutches F1 and F3. Then, the rotation of the output shaft 14 is transmitted through the first clutch C1 to the ring gear $R_2$, and the rotation of the sun gear 4 is blocked by the second brake B2 and the one-way clutch F1. As a result, the rotation of the ring gear $R_2$ is decelerated and transmitted to the carrier $CR_2$, the rotation of which is transmitted to the counter drive gear 21 while idly rotating the ring gear $R_1$.

The rotation, as transmitted from the counter drive gear 21 to the counter driven gear 22, is transmitted to the ring gear $R_3$. However, the rotation of the sun gear 6 is blocked by the fourth brake B4 so that the rotation of the carrier $CR_3$ is decelerated and transmitted to the output shaft 23.

At the 3rd speed in the D-range, the first clutch C1, the third clutch C3, the first brake B1 and the second brake B2 are applied to lock the one-way clutch F1. Then, the rotation of the output shaft 14 is transmitted through the first clutch C1 to the ring gear $R_2$, and the rotation of the sun gear 4 is blocked by the second brake B2 and the one-way clutch F1. As a result, the rotation of the ring gear $R_2$ is decelerated and transmitted to the carrier $CR_2$ so that the rotation of the carrier $CR_2$ is transmitted to the counter drive gear 21 while idly rotating the ring gear $R_1$.

The rotation, as transmitted from the counter drive gear 21 to the counter driven gear 22, is transmitted to the ring gear $R_3$. However, the relative rotation of the carrier $CR_3$ with respect to the sun gear 6 is prevented by the third clutch C3 so that the third planetary gear unit 38 comes into a directly connected state. As a result, the rotation of the counter driven gear 22 is transmitted, as is, to the output shaft 23.

At the 4th speed in the D-range, the first clutch C1, the second clutch C2, the third clutch C3 and the second brake B2 are applied. Then, the rotation of the output shaft 14 is transmitted through the first clutch C1 to the ring gear $R_2$ and through the second clutch C2 to the sun gear 4 so that the first planetary gear unit 31 and the second planetary gear unit 32 come into the directly connected state. As a result, the rotation of the output shaft 11 is transmitted as is to the counter drive gear 21.

Thus, the rotation is transmitted from the counter drive gear 21, to the counter driven gear 22, and then to the ring gear $R_3$. However, because rotation of the carrier $CR_3$ relative to the sun gear 6 is blocked by the third clutch C3, the third planetary gear unit 38 comes into the directly connected state. As a result, the rotation of the counter driven gear 22 is transmitted as is to the output shaft 23.

The automatic transmission is provided with a hydraulic circuit (not shown) for applying/releasing the first clutch C1, the second clutch C2, the third clutch C3, the first brake B1, the second brake B2, the third brake B3 and the fourth brake B4, and the hydraulic circuit is controlled by a hydraulic control unit 40. This hydraulic control unit 40 is connected to the automatic transmission control unit (ECU) 41 so that it is controlled according to the control program of the electronic control unit 41. Incidentally, the hydraulic control unit 40 corresponds to the control unit 94 of FIG. 1.

The automatic transmission control unit 41 receives signals from a neutral start switch (N.S.S.W.) 45, an oil temperature sensor 46, an R.P.M. sensor 47, a brake switch 48, an engine R.P.M. sensor 49, a throttle opening sensor 50 and a vehicle speed sensor 51.

Thus the position of the shift lever (not-shown), i.e., the selected range, is detected by the neutral start switch 45; the temperature of the oil in the hydraulic circuit is detected by the oil temperature sensor 46; and the R.P.M. of the input side of the first clutch C1, i.e., the R.P.M. of the output shaft 14 (hereinafter "clutch input side R.P.M.") $NC_1$, is detected by the R.P.M. sensor 47. Incidentally, the clutch input side R.P.M. $NC_1$ is a value corresponding to the vehicle speed, and thus the R.P.M. sensor 47 is considered to be a vehicle speed corresponding value sensor.

Actuation of the brake pedal is detected by the brake switch 48; the engine R.P.M. $N_E$ is detected by the engine R.P.M. sensor 49; the throttle opening θ is detected by the throttle opening sensor 50; and the vehicle speed can be detected by the vehicle speed sensor 51.

Figure 4:
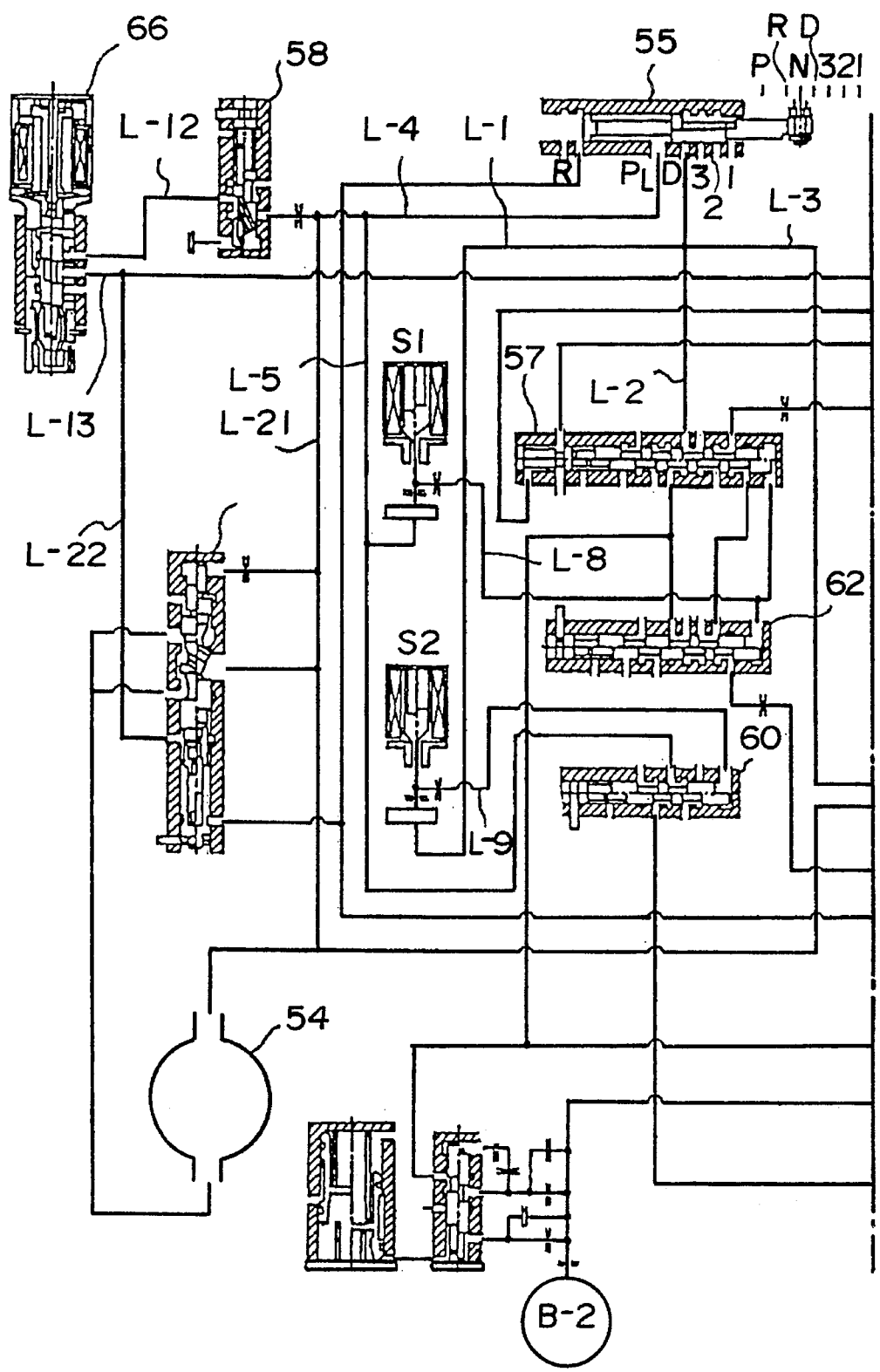
FIG. 4 is a partial hydraulic circuit diagram for an automatic transmission according to the first embodiment of the present invention.
Figure 5:
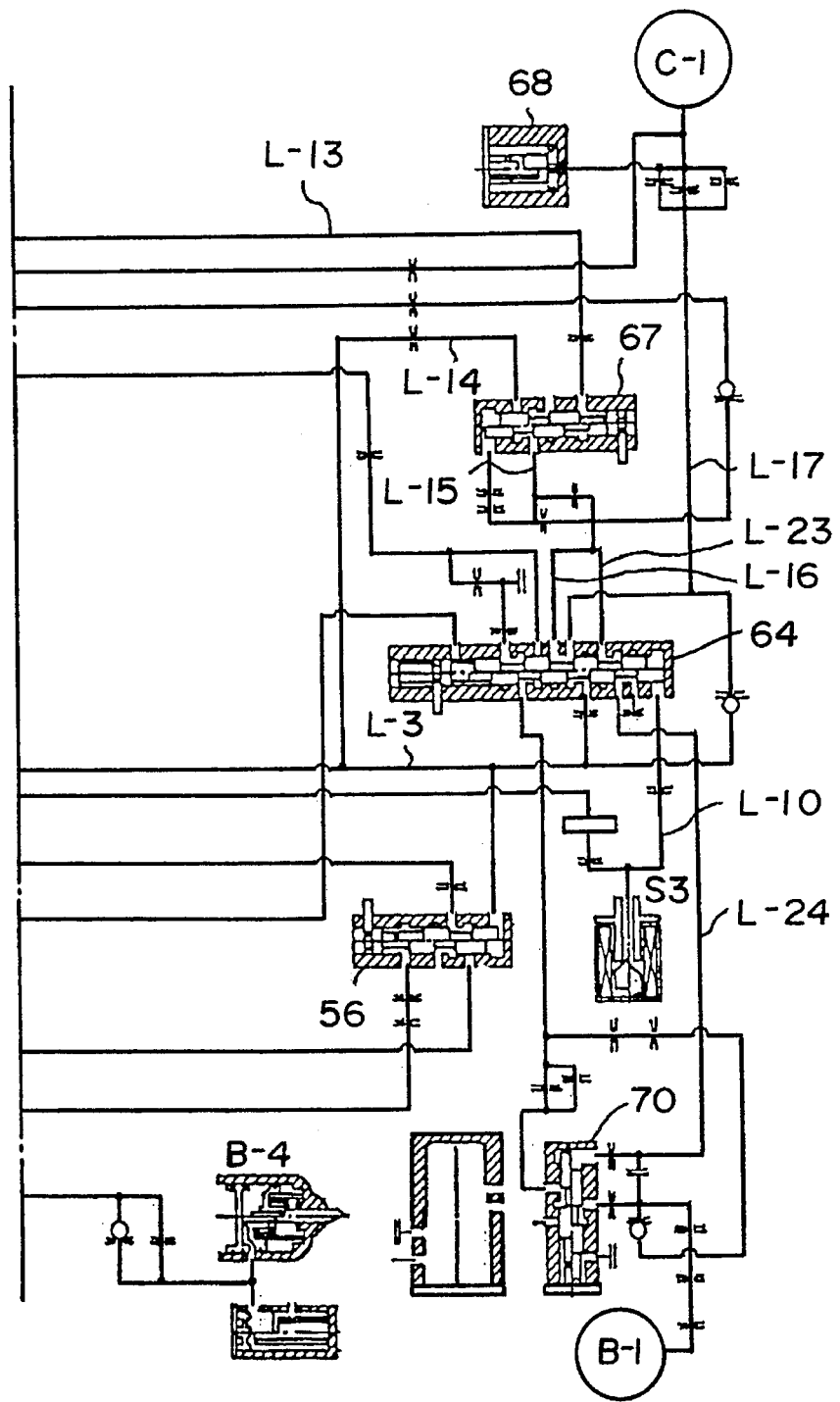
FIG. 5 shows the remainder of the hydraulic circuit diagram of FIG. 4.

FIGS. 4 and 5 show a hydraulic circuit which includes a primary valve 59 for regulating the oil pressure coming from the an oil pressure source 54. The regulated oil pressure is output as the line pressure to a line L-21. Moreover, a manual valve 55 is provided with ports 1, 2, 3, D, $P_L$ and R so that the line pressure fed from the primary valve 59 via lines L-21 and L-4 to the port $P_L$ is output as the 1-range pressure, the 2-range pressure, the 3-range pressure, the D-range pressure and the R-range pressure, respectively, at the ports 1, 2, 3, D and R by operating the shift lever (not-shown).

When the shift lever is placed in the forward drive position, the D-range oil pressure, output at the port D, is fed via a line L-1 to the second solenoid valve S2, via a line L-2 to a 1-2 shift valve 57 and via a line L-3 to a B-1 sequence valve 56. On the other hand, the line pressure from the primary valve 59 is fed via the line L-21 to the third solenoid valve S3. Moreover, the line pressure from the line L-21 is fed via the line L-4 to a solenoid modulator valve 58 and further via a line L-5 to the first solenoid valve S1 and a 2-3 shift valve 60.

The first solenoid signal, the second solenoid signal and the third solenoid signal for opening/closing the first solenoid valve S1, the second solenoid valve S2 and the third solenoid valve S3 are turned ON/OFF in response to the signals coming from the hydraulic control unit 40 (FIG. 2), so that the first solenoid valve S1 feeds the signal oil pressure via a line L-8 to the 1-2 shift valve 57 and a 3-4 shift valve 62, the second solenoid valve S2 feeds, the signal oil pressure via a line L-9 to the 2-3 shift valve 60, and the third solenoid valve S3 feeds the signal oil pressure via a line L-10 to a neutral relay valve 64.

The 1-2 shift valve 57 takes an upper half position, as seen in FIG. 4, at 1st speed and the lower half position at the 2nd, 3rd and 4th speeds; the 2-3 shift valve 60 takes the lower half position at the 1st and 2nd speeds and the upper half position at the 3rd and 4th speeds; the 3-4 shift valve 62 takes the upper half position at the 1st and 4th speeds and the lower half position at the 2nd and 3rd speeds; and the neutral relay valve 64 takes the upper half position in the neutral control state and the lower half position at the 1st to 4th speeds.

The solenoid module valve 58 is connected via a line L-12 to a linear solenoid valve 66, which is connected via a line L-13 to a C-1 control valve 67. The linear solenoid valve 66 is further connected via a line L-22 to the primary valve 59.

In response to the signal from the hydraulic control unit 40, the linear solenoid valve 66 is controlled to feed a throttle pressure $P_{TH}$ as the control oil pressure to the control valve 67. On the other hand, the C-1 control valve 67 receives the D-range pressure via the lines L-3 and L-14 and adjusts it to an oil pressure $P_{C1}$ (hereinafter "C-1 oil pressure"), for operation of the hydraulic servo C-1, in accordance with the throttle pressure $P_{TH}$ coming from the linear solenoid valve 66, and feeds the adjusted oil pressure $P_{C1}$ to a line L-15. Incidentally, the hydraulic servo C-1 corresponds to the first hydraulic servo 91 of FIG. 1.

The B-1 sequence valve 56 has a spring located its the left end in the drawing and a control oil chamber located at the right end. The spring applies a load on the spool. In 1st speed the B-1 sequence valve 56 receives in its control oil chamber the D-range pressure via the line L-3 and responds thereto by moving to the lower half position. When an increase in oil pressure is fed at 2nd speed to the hydraulic servo B-2, the B-1 sequence valve 56 receives the sequence pressure from the hydraulic servo B-2 and has its spool pushed to the right by the sequence pressure and the spring load to assume the upper half position.

As a result, the oil pressure from the 1-2 shift valve 57 is fed through the B-1 sequence valve 56 to the 3-4 shift valve 62 and further through the 1-2 shift valve 57 and the neutral relay valve 64 to hydraulic servo B-1. Thus, the hydraulic servo B-1 receives an oil pressure in accordance with the rise of the oil pressure in the hydraulic servo B-2. The hydraulic servo B-1 corresponds to the second hydraulic servo 92 of FIG. 1.

The neutral relay valve 64 takes the upper half position when in the neutral control state. In this neutral control state, therefore, the C-1 oil pressure $P_{C1}$, as generated in the line L-15, is fed through a line L-16, the neutral relay valve 64 and a line L-17 to the hydraulic servo C-1. Moreover, the C-1 oil pressure $P_{C1}$ is fed via lines L-23 and L-24 to a B-1 control valve 70.

The neutral relay valve 64 takes the lower half position in the 1st to 4th speeds. In the 1st to 4th speeds, therefore, oil at the D-range pressure is fed through the line L-3, the neutral relay valve 64 and the line L-17 to the hydraulic servo C-1. In the neutral control state, on the other hand, the neutral relay valve 64 is switched to the upper half position to connect the line L-16 and the line L-17.

A damper valve 68 is provided in the line L-17 for smoothing the discharge of the oil from the hydraulic servo C-1.

B-4 is the hydraulic servo which operates the fourth brake B4.

Figure 16:
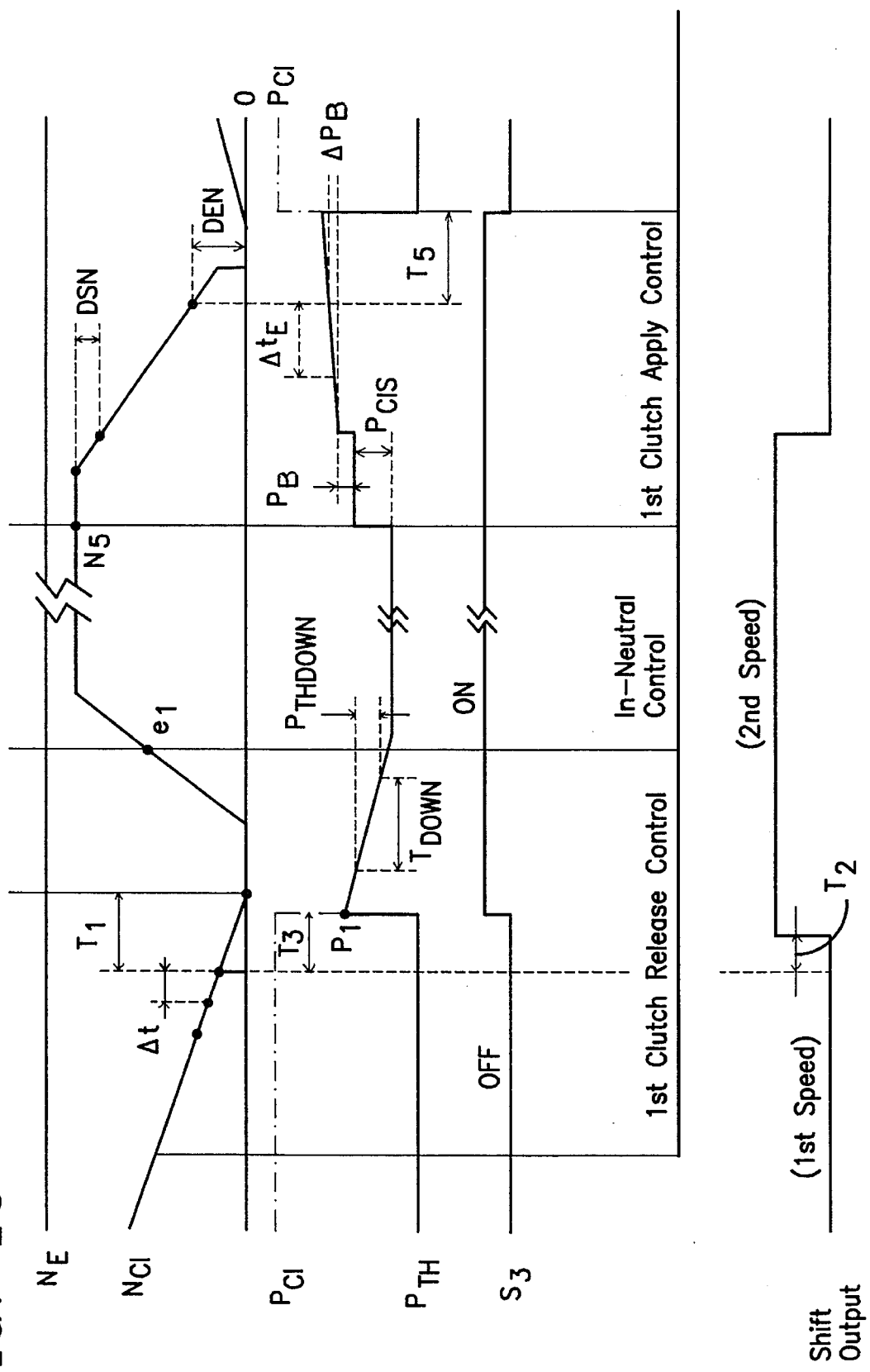
FIG. 16 is a time chart of operations of the automatic transmission control system of the first embodiment of the present invention.

FIG. 6 is a main flow chart showing the operations of the automatic transmission control unit in the first embodiment of the present invention, and FIG. 16 is a time chart for those operations. FIG. 16 will also be referred to the later description of the individual subroutines.

Step S1: The first clutch release control is executed. In this case, with the vehicle speed zero being assumed, the shift output of the 2nd speed is issued at a set timing to start the applications of the second brake B2 (FIG. 2) and the third brake B3 to thereby effect hill hold control, and the throttle pressure $P_{TH}$ is swept down at a set timing.

For these operations, the engine R.P.M. $N_E$ corresponding to the input torque is determined, and the throttle pressure $P_{TH}$ corresponding to the engine R.P.M. $N_E$ is determined to set oil pressure $P_1$ so that the C-1 oil pressure $P_{C1}$ is set to the set oil pressure $P_1$ and is then gradually reduced.

Incidentally, the input torque can be detected not only from the engine R.P.M. $N_E$ but also indirectly from the engine air intake, the fuel injection rate and so on. Moreover, the input torque of the speed change unit 16 can also be directly detected by a torque sensor (not-shown). In this latter case, the torque sensor is attached to the output shaft 14 of the torque converter 12.

Step S2: The pressure reducing means 943 (FIG. 1) executes the in-neutral control subroutine to establish the neutral control state. In this case, the stabilization of both the engine R.P.M. $N_E$ and the clutch input side $N_{C1}$ is awaited. The C-1 oil pressure $P_{C1}$ is boosted or reduced by set pressure increments on the basis of the stabilized values of engine R.P.M. $N_E$ and clutch input side R.P.M. $N_{C1}$.

Step S3: The first clutch apply control subroutine is executed. In this case, the C-1 oil pressure $P_{C1}$ is boosted by values which are set on the basis of the throttle opening θ, the engine R.P.M. $N_E$ and so on, to end the piston stroke of the hydraulic servo C-1 (FIG. 5). After the end of the piston stroke of the hydraulic servo C-1, the C-1 oil pressure $P_{C1}$ is boosted by set pressure increments to prevent shock.

Figure 7:
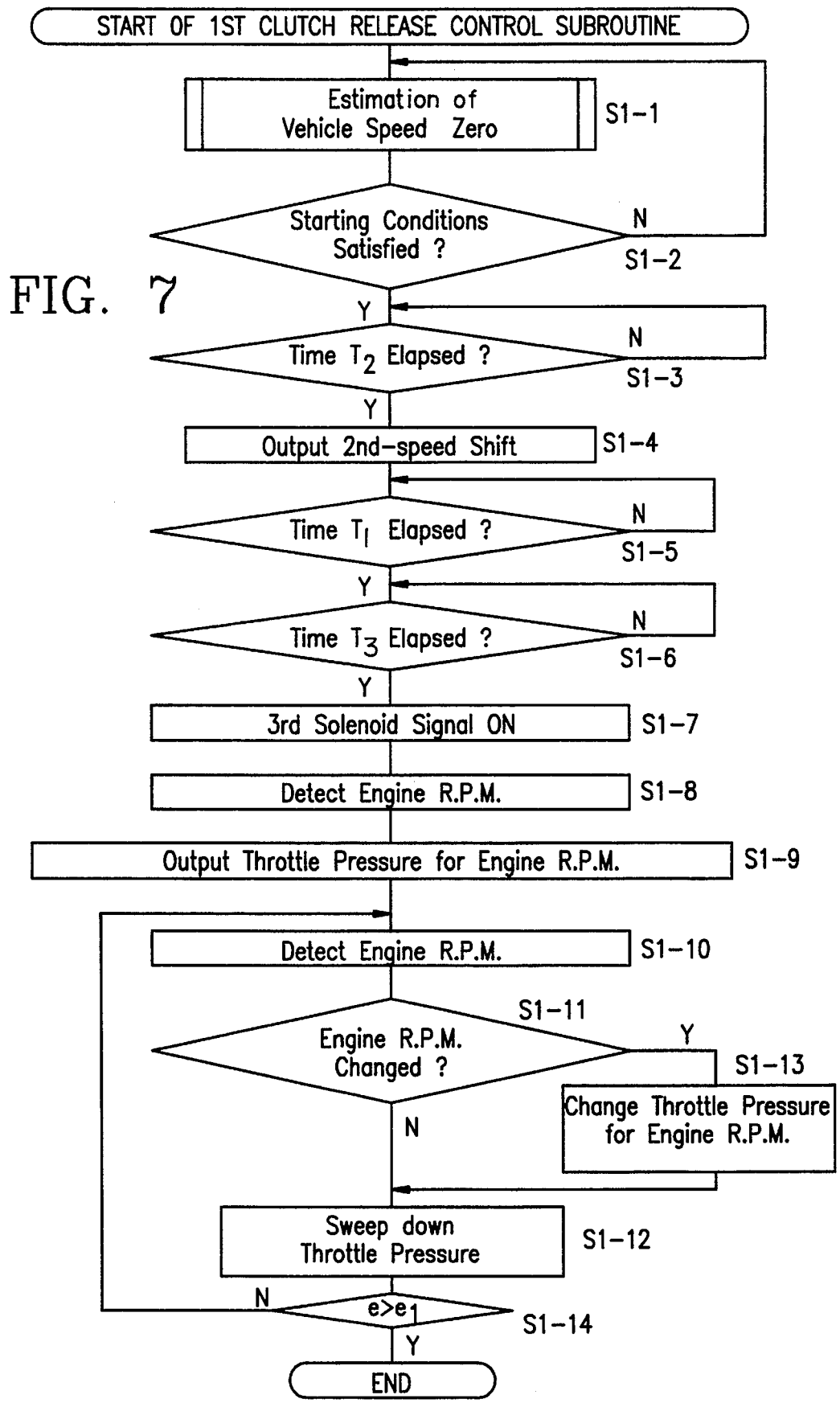
FIG. 7 is a flow chart of a first clutch release control subroutine in the first embodiment of the present invention.
Figure 8:
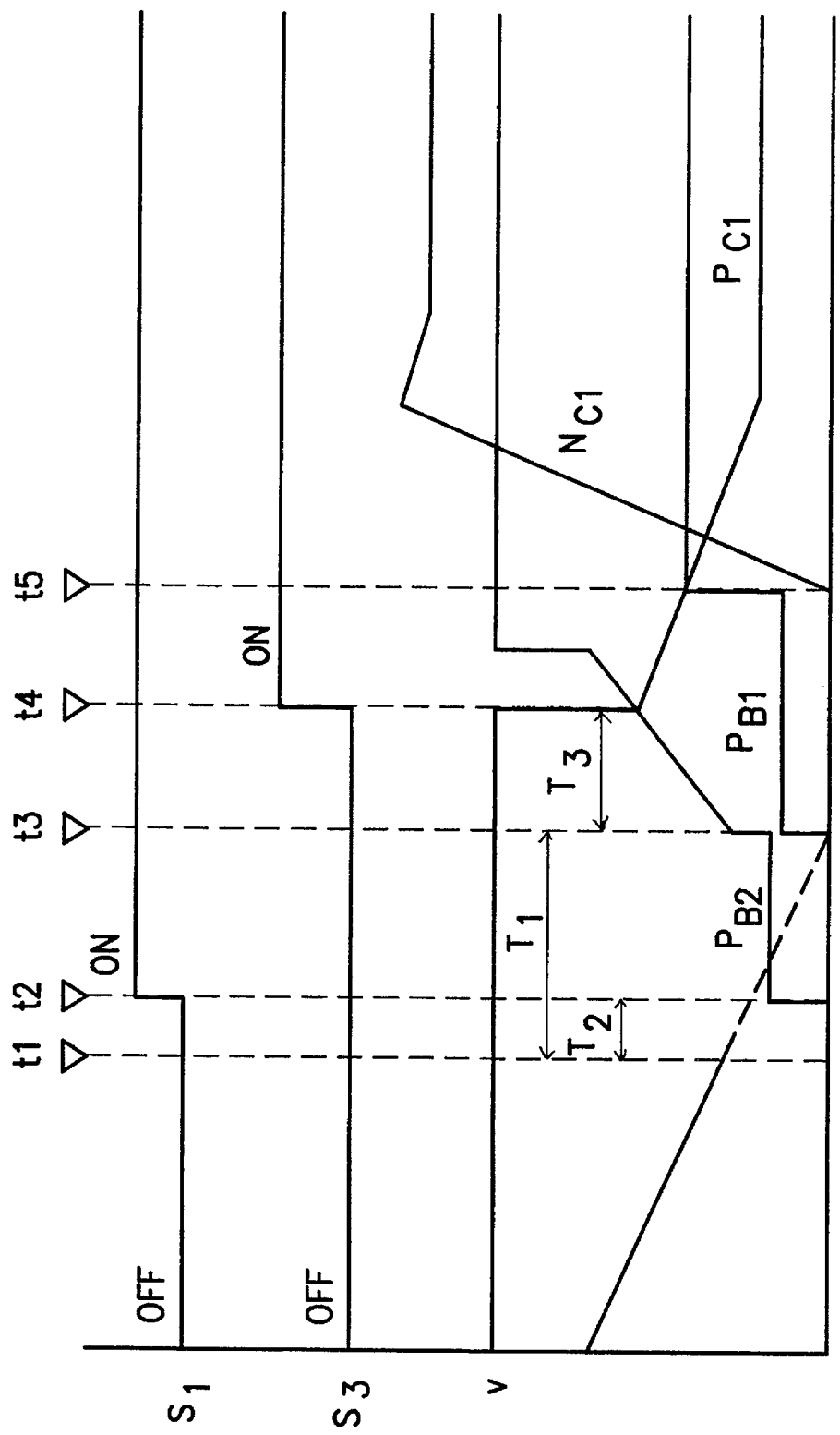
FIG. 8 is a time chart of the first clutch release control subroutine in the first embodiment of the present invention.

The subroutine of the first clutch release control, which is Step S1 in FIG. 6, is shown in FIG. 7 and FIG. 8. In FIG. 8: $S_1$ designates a signal for opening/closing the first solenoid valve S1 (FIG. 4); $S_3$ is a signal for opening/closing the third solenoid valve S3 (FIG. 5); $P_{C1}$ is the oil pressure fed to the hydraulic servo C-1; "v" is the vehicle speed; $P_{B1}$ is the oil pressure fed to the hydraulic servo B-1; $P_{B2}$ is the oil pressure fed to the hydraulic servo B-2; $N_{C1}$ is the clutch input side R.P.M.; and $T_1$ to $T_3$ are time periods timed by the first to third timers, respectively.

At the 2nd speed in the D-range, as described before, the sun gear 2 of the first planetary gear unit 31 is restrained through the one-way clutch F1 by applying the second brake B2 (FIG. 2). The engine braking first brake B1 and the second brake B2, which are arranged in parallel, are applied at the 2nd speed in the D-range.

Oil pressure is fed to the hydraulic servo B-2 of the second brake B2 and oil pressure is fed to the hydraulic servo B-1 of the first brake B1 in accordance with the rise of the oil pressure in the hydraulic servo B-2. As a result, when a predetermined time period has elapsed after start of the feed of oil pressure to the hydraulic servo B-2, the feed of the oil pressure to the hydraulic servo B-1 is started so that shift shock can be prevented.

However, if the neutral control and the hill-hold control are applied to a control system for an automatic transmission of this type, the second brake B2 has to be applied before the application of the first brake B1, the latter being necessary for the hill-hold control. Thus, in application of the first brake B1, the movement of the piston of the hydraulic servo B-1 must be started after completion of the piston stroke in the hydraulic servo B-2. As a result, the start of the hill-hold control is accordingly delayed. This reduces the advantages gained by neutral control in reducing fuel consumption and suppressing vibration.

In the present invention the advantages of neutral control in reducing fuel consumption and suppressing vibration are retained by starting the feed of oil pressure to the hydraulic servo B-1 after lapse of a predetermined time period beginning with the initiation of feed of oil pressure to the hydraulic servo B-2.

Step S1-1: That the vehicle speed is zero is estimated on the basis of the clutch input side R.P.M. $N_{C1}$.

Step S1-2: Satisfaction of the conditions for starting the hill hold control and the neutral control is awaited. If the starting conditions are satisfied at time t1 in FIG. 8, the timing operations of the first and second timers (not shown) are started, and the subroutine advances to Step S1-3.

In this case, the following starting conditions must be satisfied: the clutch input side R.P.M. $N_{C1}$ is substantially 0; the accelerator pedal (not-shown) is released so that the throttle opening θ is below a predetermined value; the oil temperature detected by the oil temperature sensor 46 is over a predetermined value; and the brake pedal (not-shown) is depressed to turn ON the brake switch 48. Incidentally, whether or not the clutch input side R.P.M. $N_{C1}$ is substantially 0 is decided by vehicle speed corresponding value decision means 85 in dependence upon whether or not a detection limit is detected by the R.P.M. sensor 47. In the present embodiment, the detection limit is set to correspond to an actual vehicle speed v of 2 km/h.

Step S1-3: The lapse of a time period $T_2$, timed by the second timer, is awaited, and the subroutine advances to Step S1-4 upon expiration of the time period $T_2$. Here, the time period $T_2$ is calculated by subtracting the time period from the start to the end of the piston stroke of the hydraulic servo B-2 (hereinafter "piston stroke time period"), about 0.4 secs in the present embodiment, from the time period $T_1$ which is calculated by the zero speed estimation.

Step S1-4: The oil pressure feed means 944 starts the hill-hold control. At a time t2, the 2nd speed shift output is output to turn ON the first solenoid signal $S_1$ for opening/closing the first solenoid valve S1 to thereby start the feed of the oil pressure to the hydraulic servo B-2 of the second brake B2.

Step S1-5: The lapse of the time period $T_1$, timed by first timer, is awaited and the timing operation of the third timer (not shown) is started if the time period $T_1$ has elapsed at time t3. At the instant of expiration of the of the time period $T_1$, the piston stroke of the hydraulic servo B-2 ends, and the oil pressure in the hydraulic servo B-2 rises to start the application of the second brake B2.

In accordance with the rise of the oil pressure in the hydraulic servo B-2, the sequence pressure in the hydraulic servo B-2 is fed to the B-1 sequence valve 56 to start the feed of the oil pressure to the hydraulic servo B-1. It is estimated that the vehicle speed drops to zero at the time t3.

Step S1-6: The lapse of the time period $T_3$, clocked by the third timer, is awaited, and the subroutine advances to Step S1-7 if the time period $T_3$ has elapsed. In this case, the time period $T_3$ is set to the difference which is calculated by subtracting a delay time period $\tau_2$ from a piston stroke time period $\tau_1$, wherein: the time period $\tau_1$ is the time period of the piston stroke of the hydraulic servo B-1; and the delay time period $\tau_2$ is the time period beginning with the third solenoid signal $S_3$ for opening/closing the third solenoid valve S3 and ending with initiation of the transition of the first clutch C1 from the applied state to the slipping state at time t5. In the present embodiment, the time period $T_3$ is set to 0.5 to 0.7 secs, but this setting is preferably changed according to the temperature of the oil because both the piston stroke time period $\tau_1$ and the delay time period $\tau_2$ will vary with change of the viscosity of the oil.

Thus, the application of the first brake B1 is ended at the time t5 to effect the hill-hold control.

Thus, in the hill hold control, the 2nd speed gear stage is established in the speed change unit 16 so that the first clutch C1, the first brake B1, the second brake B2 and the fourth brake B4 are applied to lock the one-way clutches F1 and F3. In this state, if the vehicle starts to roll backward, the reverse rotation is transmitted to the output shaft 23 of the auxiliary transmission 19 to rotate the ring gear $R_1$ forward. However, this rotation is blocked by the one-way clutch F2 so that the vehicle will not move backward.

Therefore, when the hill-hold control is started simultaneously with establishment of the neutral control state with the vehicle facing uphill on an incline, the transition of the first clutch C1 to the slipping state is not started until the first brake B1 is applied to actually effect the hill-hold control, so that the vehicle can be prevented from moving backward.

As a result, the application of the first brake B1 is not started during a rearward movement of the vehicle, so that shock can be prevented.

With a delay in the establishment of the neutral control state, on the other hand, the effects of the neutral control in reducing fuel consumption and suppressing vibration are accordingly reduced. Subsequent to the start of the application of the first brake B1, however, the transition of the first clutch C1 to the slipping state can be started to shorten the useless time period and to thereby preserve the fuel consumption reduction and the vibration suppression effects.

Step S1-7: At time t4, the third solenoid signal $S_3$ for opening/closing the third solenoid valve S3 is turned ON to switch the neutral relay valve 64 to the upper half position to thereby bring the C-1 oil pressure $P_{C1}$ into a regulated state.

Figure 9:
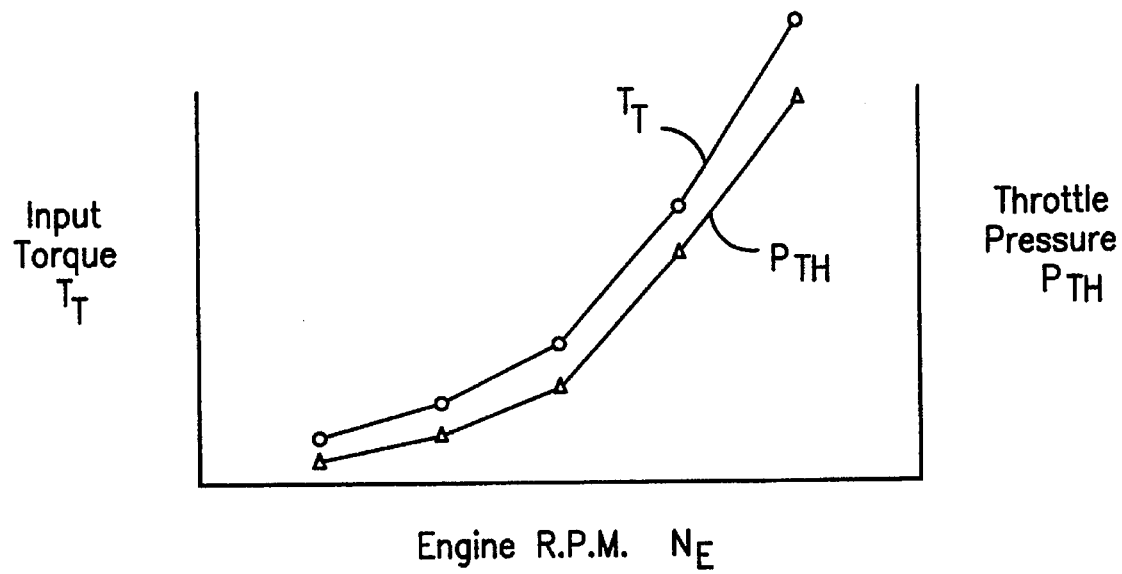
FIG. 9 is a graph of input torque $T_T$ and throttle pressure $P_{TH}$ (ordinates) versus engine R.P.M. $N_E$ in the first embodiment of the present invention.

Step S1-8: As shown in FIG. 9, the engine R.P.M. $N_E$ corresponding to the input torque $T_T$ is detected, and a reference engine R.P.M. $N_{Em}$ is set to the value of the engine R.P.M. $N_E$.

Step S1-9: The throttle pressure $P_{TH}$ just before the start of the release of the first clutch C1 is determined to correspond to the engine R.P.M. $N_E$ and is set as the set oil pressure $P_1$, and the C-1 oil pressure $P_{C1}$ is reduced to the set oil pressure $P_1$.

Step S1-10: The engine R.P.M. $N_E$ corresponding to the input torque $T_T$ is again detected.

Step S1-11: It is decided whether or not the engine R.P.M. $N_E$ has changed relative to the reference engine R.P.M. $N_{Em}$. The subroutine advances to Step S1-12, if not changed, but to Step S1-13 if changed.

Step S1-12: The throttle pressure $P_{TH}$, i.e., the C-1 oil pressure $P_{C1}$, is lowered (or swept down) by set pressure increments $P_{THDOWN}$ at the end of each set time period $T_{DOWN}$ as expressed by Equation (1):

$$P_{TH} = P_{TH} - P_{THDOWN} \qquad (1).$$

In the meanwhile, the feed of the oil pressure to the hydraulic servo B-1 is continued, and the movement of the piston in the piston stroke of the hydraulic servo B-1 is ended at time t5 to start the application of the first brake B1. As a result, the hill-hold control is effective until slipping of the first clutch C1 is started at time t5.

Step S1-13: The instant when it is decided at Step S1-11 that value of the engine R.P.M. $N_E$ has changed relative to the reference engine R.P.M. $N_{Em}$ is set as the reference engine R.P.M. $N_{Em}$, and the C-1. oil pressure $P_{C1}$ is changed to the throttle pressure $P_{TH}$ corresponding to the new reference engine R.P.M. $N_{Em}$.

Step S1-14: After the start of the transition of the first clutch C1 to the slipping state, the return to Step S1-10 is repeated until the following speed ratio e exceeds a constant $e_1$:

$$e = N_{C1}/N_E.$$

This pressure reduction of Step S1-12 is stopped when the speed ratio e exceeds the constant $e_1$. This constant $e_1$ is set, for example to 0.75, in consideration of the delay of the change of the clutch input side R.P.M. $N_{C1}$ when the first clutch C1 is released. Incidentally, the speed ratio e may be replaced by the clutch input side R.P.M. $N_{C1}$.

The applied state of the first clutch C1 is not suitably determined by deciding whether or not a differential in rotation $\Delta N$ has changed, because the differential rotation $\Delta N$ will not change regardless of whether the first clutch C1 is completely applied or released. As a result, it is difficult to differentiate between the state in which the first clutch C1 is completely applied and the state in which the first clutch C1 is released. Therefore, in the present invention the state just before the application of the first clutch C1 is started can be reliably restored by waiting until the speed ratio e exceeds the constant $e_1$.

The subroutine of the vehicle speed zero estimation of Step S1-1 of FIG. 7 will now be described. In the neutral control, the vehicle speed sensor 51 is usually used to decide if the vehicle has stopped but generally has low accuracy when the vehicle speed v is extremely low. Especially, the electromagnetic pickup type vehicle speed sensor, designed to detect the rotating speed of a rotor with an output of pulses, fails to produce an output when the speed of rotation falls below a certain value, so that it cannot detect the low vehicle speeds necessary for a decision whether or not the vehicle speed v is zero. In view of this problem, there has been provided a control system for an automatic transmission which decides if the vehicle has stopped assuming a detection error by the vehicle speed sensor 51 even if the vehicle speed v is decided to be zero, whereby the establishment of neutral control is delayed by a predetermined time period determined by a timer.

The time period beginning when the rotating speed has become lower than the predetermined value and ending when the vehicle actually stops differs greatly between those cases in which the vehicle stops with a gradual deceleration and those cases where it stops with rapid deceleration. If the time period set for the timer is lengthened to match a gentle deceleration, the time period before the neutral control state is established is likewise lengthened to thereby reduce the fuel consumption saving and vibration suppression effects of the neutral control.

Incidentally, if a delay in establishment of the neutral control state under control of a timer is applied to the present invention, the hill-hold control precedes the establishment of the neutral control state. Accordingly, operation of the timer is started after the vehicle speed v has been decided to be zero, in that the feed of the oil pressure to the hydraulic servo B-2 of the second brake B2 is started after lapse of a set time period, and in that the neutral control state is established after the end of the piston stroke. These effects tend to increase fuel consumption and vibration, which are intended to be reduced by the neutral control.

On the other hand, if the time period to be clocked by the timer is shortened to match a rapid deceleration, the hill-hold control is started in spite of the fact that the vehicle has not yet stopped, and application of the second brake B2 to effect a shift to another gear stage (for the 2nd speed) will cause a shift shock.

In the present invention, therefore, the vehicle speed zero estimation is executed to prevent both an increase in fuel consumption and an increase in vibration which would otherwise be occasioned by the delay in the establishment of the neutral control state and to prevent a shift shock due to premature start of the hill-hold control.

Figure 10:
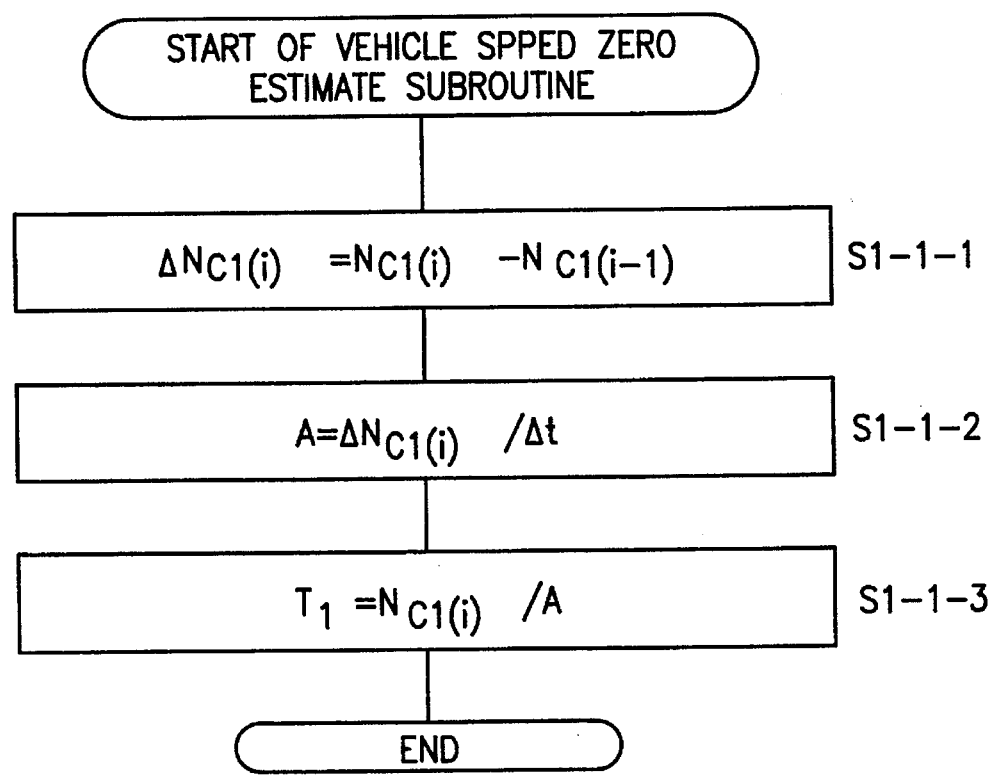
FIG. 10 is a flow chart of a vehicle speed zero estimate subroutine in the first embodiment of the present invention.

A vehicle speed zero estimate subroutine for the first embodiment will now be described with reference to FIG. 10.

Step S1-1-1: The R.P.M. difference $\Delta N_{C1(1)}$, is calculated by subtracting the clutch input side R.P.M. $N_{C1(1-1)}$, at a time $\Delta t$ prior to the present, from the present clutch input side R.P.M. $N_{C1(1)}$. In this case, the time period $\Delta t$ is measured by the clock in the automatic transmission control unit 41 (FIG. 2) so that the clutch input side R.P.M. $N_{C1}$ is detected at expiration of each time period $\Delta t$.

Step S1-1-2: The deceleration calculation means 86 calculates the deceleration A of the vehicle by dividing the R.P.M. difference $\Delta N_{C1(1)}$, by the time period $\Delta t$.

Step S1-1-3: The vehicle stop estimation means 87 calculates the time period $T_1$ for the vehicle to come to a stop by dividing the present clutch input side R.P.M. $N_{C1(1)}$ by the deceleration A.

Thus, since the time period for the vehicle to come to a stop is estimated on the basis of the deceleration A, the first brake B1 is not applied during the running of the vehicle, even if the deceleration A of the vehicle fluctuates, so that shock upon shift to the 2nd speed is avoided. Moreover, since the start of the application of the first brake B1 is effected as early as possible, the transition of the first clutch C1 to slipping can accordingly be moved forward in time. This approach maintains the fuel consumption reducing effect and the vibration suppressing effect afforded by the neutral control.

Figure 11:
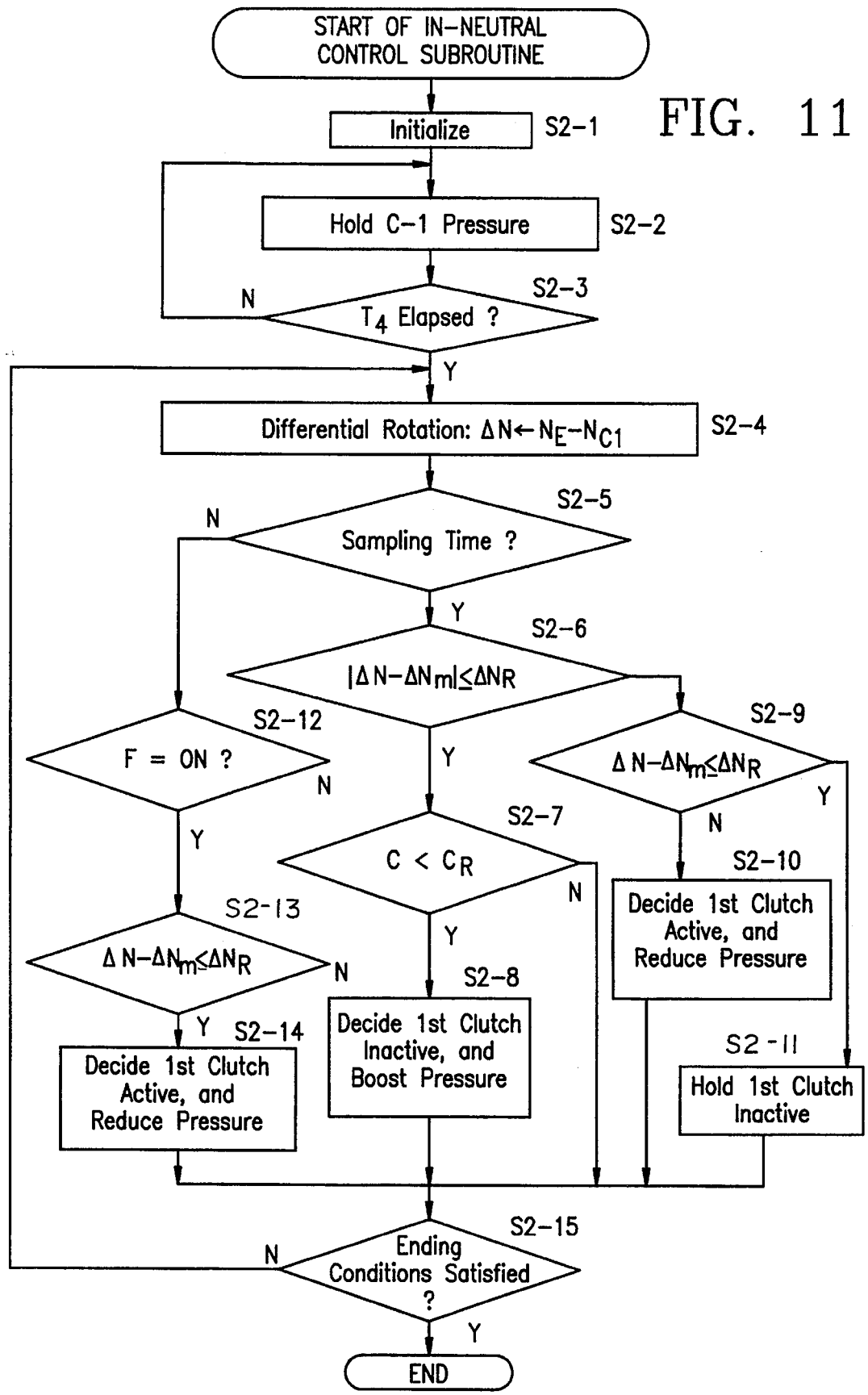
FIG. 11 is a flow chart of an in-neutral control subroutine in the first embodiment of the present invention.
Figure 12:
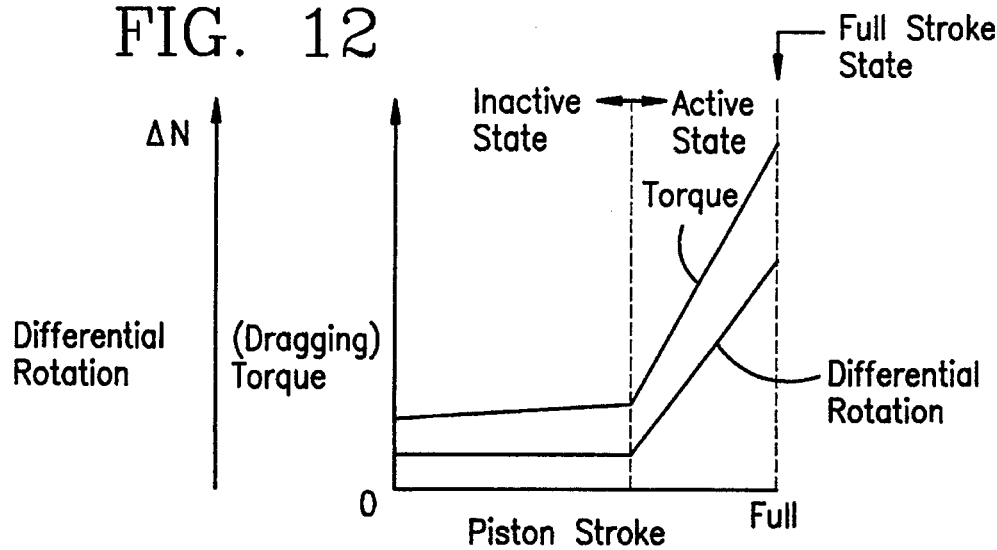
FIG. 12 is a graph illustrating operation of a first clutch under neutral control in the first embodiment of the present invention.
Figure 13:
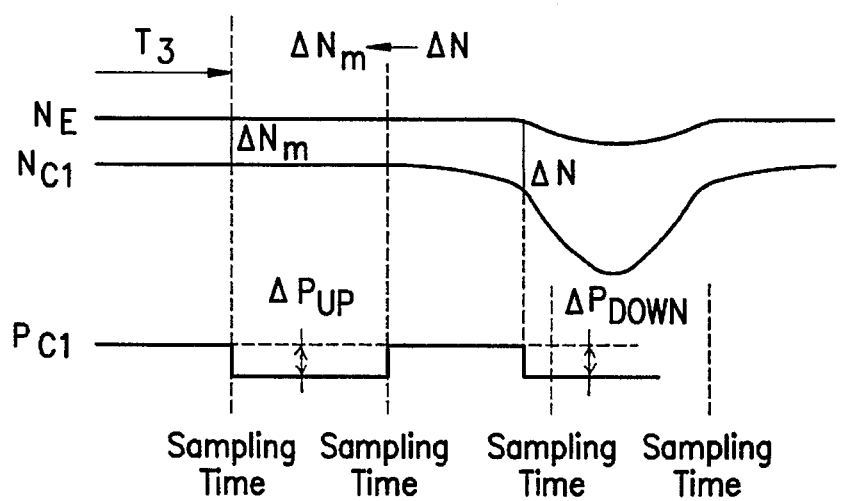
FIG. 13 is a time chart illustrating engine R.P.M., clutch input side R.P.M. and C-1 oil pressure versus time under neutral control in the first embodiment of the present invention.

The subroutine for the in-neutral control, i.e. Step S2 of FIG. 6, will now be described with reference to FIGS. 11 to 13. Incidentally, FIG. 12 plots the differential rotation $\Delta N$ and the (dragging) torque against the piston stroke.

Step S2-1: An oil pressure control flag F, the count value C of the counter (not-shown), and the reference R.P.M. difference $\Delta N_m$ are set to the following initial values:

F←Off;

C←0; and $\Delta N_m$←the value $(N_E - N_{C1})$ at that time.

Steps S2-2 and S2-3: The C-1 oil pressure $P_{C1}$ is held at the final value of the first clutch release control. After it has been confirmed that the first clutch C1 (FIG. 2) has been released to a predetermined extend, a decision is promptly made as to whether the differential rotation $\Delta N$ has changed. Because error may occur in this decision due to the change in the differential rotation $\Delta N$ deriving from the pressure reduction in the first clutch release control, a fourth timer is used to continue holding the C-1 oil pressure $P_{C1}$ until the time period $T_4$ has elapsed. As a result, the decision as to whether or not the differential rotation $\Delta N$ has been changed is delayed to prevent affecting the C-1 oil pressure $P_{C1}$ while in the unstable state just after the first clutch C1 has been released.

Step S2-4: The differential rotation $\Delta N$ between the engine R.P.M. $N_E$ and the clutch input side R.P.M. $N_{C1}$ is calculated.

Step S2-5: It is decided whether or not a preset sampling time has been reached, that is, whether or not a time period of 1.0 sec or 0.5 sec has elapsed. The subroutine advances to Step S2-6, if the sampling time has been reached, but to Step S2-12 if NOT.

Step S2-6: It is decided whether or not the absolute value of the difference between the differential rotation $\Delta N$ and the reference differential rotation $\Delta N_m$ is below a set value $\Delta N_R$, that is, whether or not the change in the differential rotation $\Delta N$ is below the set value $\Delta N_R$. The subroutine advances to Step S2-7, if below the set value $\Delta N_R$ but to Step S2-9 if over the set value $\Delta N_R$. This set value $\Delta N_R$ is set in advance to discriminate between the active state and the inactive state of the first clutch C1, as shown in FIG. 12.

In calculation of the differential rotation $\Delta N$, error may be introduced by an erroneous signal from the input side R.P.M. sensor or from the output side R.P.M. sensor or in the calculation itself. In consideration of the fact that the differential rotation $\Delta N$ abruptly changes if the application of the first clutch C1 is started prematurely, a change of the differential rotation $\Delta N$ is determined only if the differential rotation $\Delta N$ exceeds the set value $\Delta N_R$.

Moreover, if this set value $\Delta N_R$ is varied according to the oil temperature, the C-1 oil pressure $P_{C1}$ can be properly controlled for low to high oil temperatures.

Step S2-7: It is decided whether or not the count value C of the counter is below a set value $C_R$. The subroutine advances to Step S2-8, if below the set value $C_R$, but to Step S2-15 if over the set value $C_R$.

Step S2-8: It is decided that the first clutch C1 is inactive, because of no change in the differential rotation $\Delta N$. In this state, to limit the extent of return of the piston of the hydraulic servo C-1 (FIG. 5), the C-1 oil pressure $P_{C1}$ is boosted, as shown in FIG. 13, by a set pressure $\Delta P_{UP}$, as follows:

$P_{C1} \leftarrow P_{C1} + \Delta P_{UP}$.

Moreover, the reference differential rotation $\Delta N_m$ is set to the differential rotation $\Delta N$, and the oil pressure control flag F is turned ON:

$\Delta N_m \leftarrow \Delta N$;

and

F←ON.

Step S2-9: It is decided whether or not the change in the differential rotation $\Delta N$ has a tendency to decrease, that is, whether or not the difference of the differential rotation $\Delta N$ and the reference differential rotation $\Delta N_m$ is below the set value $\Delta N_R$. The subroutine advances to Step S2-11, if below the set value $\Delta N_R$, but to Step S2-10 if over the set value $\Delta N_R$.

Step S2-10: It is decided that the first clutch C1 is in transition from the inactive state to the active state. Hence, the C-1 oil pressure $P_{C1}$ is reduced by a set pressure $\Delta P_{DOWN}$, as follows:

$P_{C1} \leftarrow P_{C1} - \Delta P_{DOWN}$.

Moreover, the reference differential rotation $\Delta N_m$ is set to the differential rotation $\Delta N$, and the oil pressure control flag F is turned OFF whereas the value "1" is subtracted from the count value C of the counter. The C-1 oil pressure $P_{C1}$ at this time is set as a reference C-1 oil pressure $P_{C1m}$ as follows:

$\Delta N_m \leftarrow \Delta N$;

F←OFF;

C←C−1 (C=0 for C<0);

and $P_{C1m} \leftarrow P_{C1}$.

Step S2-11: Since the first clutch C1 is decided to be in transition from the active state to the inactive state, the C-1 oil pressure $P_{C1}$ is held at the value of that time, and the oil pressure control flag F is turned OFF:

F←OFF.

If the differential rotation $\Delta N$ is changed, this change is a decrease when the first clutch C1 is in transition from the active state to the inactive state. At this time, if the C-1 oil pressure $P_{C1}$ is further reduced, the piston may abruptly move back to the extent of an excessive stroke loss. Therefore, the reduction of the C-1 oil pressure $P_{C1}$ is inhibited and held at the value of that point in time, when the first clutch C1 is in transition from the active to the inactive state.

Step S2-12: It is decided whether or not the oil pressure control flag F is ON, that is, whether or not the C-1 oil pressure $P_{C1}$ was boosted at the previous sampling time. The subroutine advances to Step S2-13, if the oil pressure control flag F is ON, but to Step S215 if OFF.

Step S2-13: It is decided whether or not the difference between the differential rotation $\Delta N$ and the reference differential rotation $\Delta N_m$ is below the set value $\Delta N_R$ (due to a boost in the C-1 oil pressure $P_{C1}$ at the previous sampling). The subroutine advances to Step S2-14, if below the set value $\Delta N_R$, but to Step S2-15 if over the set value $\Delta N_R$.

Step S2-14: The differential rotation $\Delta N$ is changed by boosting the C-1 oil pressure $P_{C1}$ of the previous sampling. As a result, it is decided that the first clutch C1 is in the applied state, and reduces the C-1 oil pressure $P_{C1}$ by the set pressure $\Delta P_{DOWN}$;

$$P_{C1} \leftarrow P_{C1} - \Delta P_{DOWN}.$$

Moreover, the reference differential rotation $\Delta N_m$ is set to the differential rotation $\Delta N$, and the oil pressure control flag F is turned OFF whereas the value "1" is added to the count value of the counter. As at Step S2-10, the C-1 oil pressure $P_{C1}$ at this instant is set as the reference C-1 oil pressure $P_{C1m}$ as follows:

$$\Delta N_m \leftarrow \Delta N;$$

$$F \leftarrow OFF;$$

$$C \leftarrow C+1;$$

and $$P_{C1m} \leftarrow P_{C1}.$$

As previously described, it is decided whether or not the differential rotation $\Delta N$ has been changed at each sampling instant. When the C-1 oil pressure $P_{C1}$ is boosted responsive to that decision, the application of the first clutch C1 is instantly started, but would be susceptible to being released with generation of vibration if torque transmission has already been started. Therefore, when the differential rotation $\Delta N$ is increased while the application of the first clutch C1 has started, the C-1 oil pressure $P_{C1}$ is reduced without awaiting the subsequent sampling. Thus, the first clutch C1 is prevented from being released to prevent idle vibration.

Moreover, the C-1 oil pressure $P_{C1}$ is changed to ON when the change in the differential rotation $\Delta N$ is higher than the set value $\Delta N_R$ at a sampling, as described before. In this case, if the differential rotation changes only in small increments, the C-1 oil pressure $P_{C1}$ may not be changed in spite of the fact that the first clutch C1 has switched to the applied state. Thus, the reference differential rotation $\Delta N_m$ is updated only when the C-1 oil pressure $P_{C1}$ has changed. As a result, the change of the C-1 oil pressure $P_{C1}$ can be ensured, even in the case where the differential rotation $\Delta N$ is changed only in small increments, so that application of the first clutch C1 is highly reliable.

Step S2-15: It is decided whether or not the conditions for ending the in-neutral control of the first clutch C1 are satisfied. If the ending conditions are satisfied, the in-neutral control is ended. Otherwise, the subroutine returns to Step S2-4, and the foregoing steps are repeated.

Figure 14:
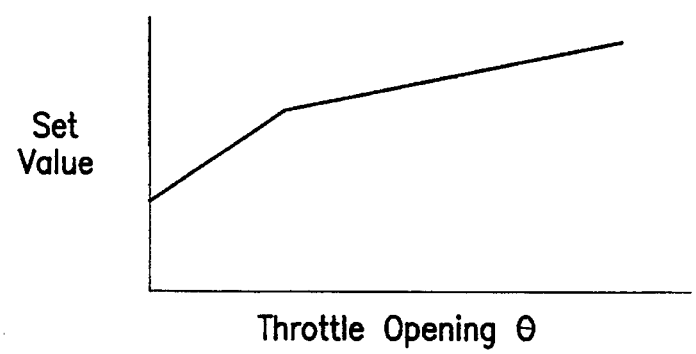
FIG. 14 is a graph of a set value versus throttle opening in the first embodiment of the present invention.
Figure 15:
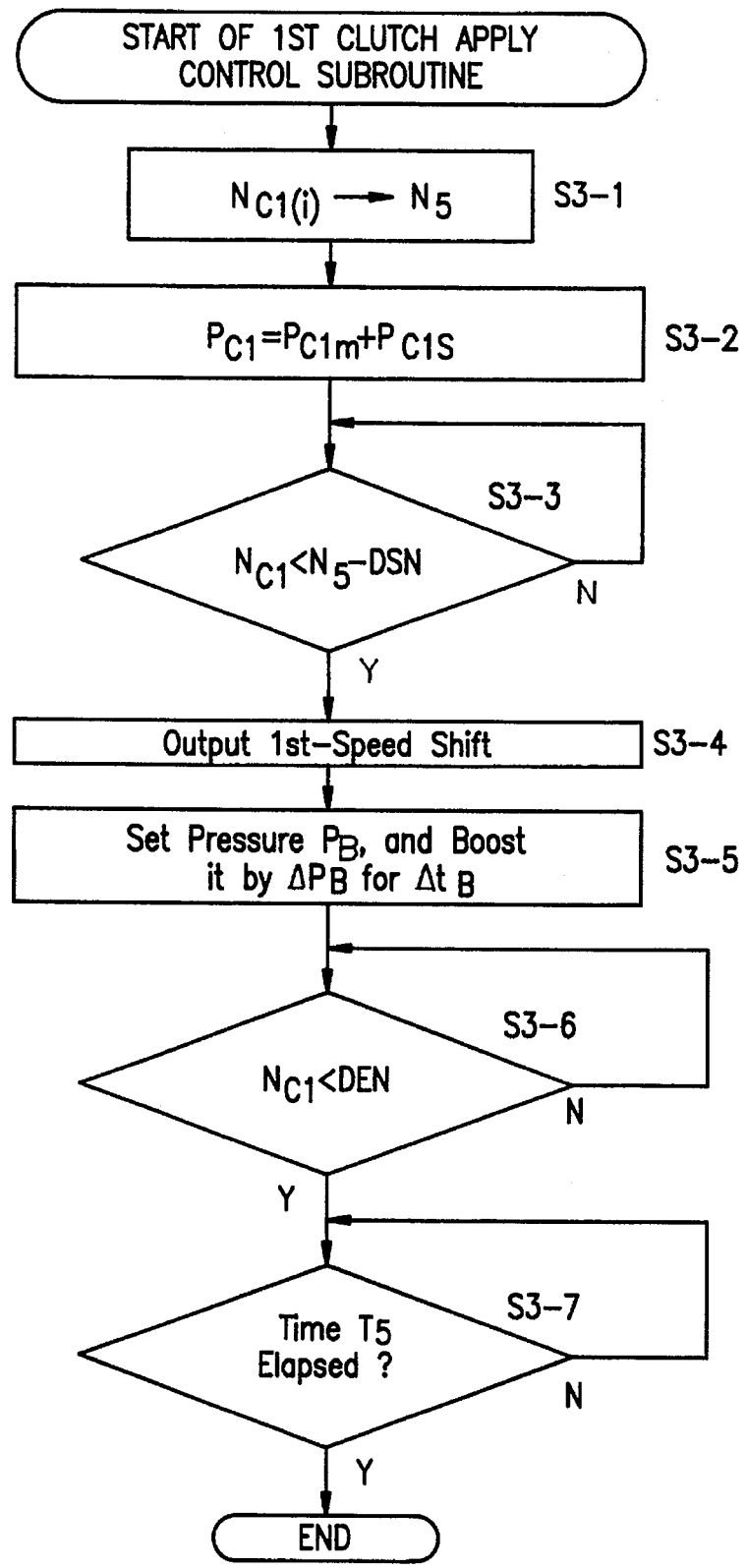
FIG. 15 is a flow chart of a 1st clutch application control subroutine in the first embodiment of the present invention.

The subroutine of the first clutch apply control, i.e. Step S3 of FIG. 6, will now be described with reference to FIGS. 14 and 15.

Step S3-1: The clutch input side R.P.M. $N_{C1(1)}$ at the instant when the in-neutral control ending conditions are satisfied is stored as a value $N_5$ in the memory (not-shown) in the automatic transmission control unit 41 (FIG. 2).

Step S3-2: A constant $P_{C1s}$ is added to the reference C-1 oil pressure $P_{C1m}$ set at Steps S2-10 and S2-11, and the sum is set as the C-1 oil pressure $P_{C1}$. Incidentally, the constant $P_{C1s}$ is set to such a value as to move the piston (not-shown) of the hydraulic servo C-1 (FIG. 5) without fail and to minimize the engaging shock generated by the application.

Step S3-3: The control routine waits until the clutch input side R.P.M. $N_{C1}$ becomes smaller than the difference between the value $N_5$ and a constant DSN. When the clutch input side R.P.M. $N_{C1}$ becomes smaller than the difference between the value $N_5$ and the constant DSN, the start of application of the first clutch C1 is decided, and the subroutine advances to Step S3-4.

Step S3-4: The 1st-speed shift output is issued.

Step S3-5: The throttle pressure $P_{TH}$ coming from the linear solenoid valve 66 (FIG. 4) is changed to boost the C-1 oil pressure $P_{C1}$ to a pressure $P_B$ and the C-1 oil pressure $P_{C1}$ is then boosted by set pressure increments $\Delta P_B$ at each lapse of a time period $\Delta t_B$ to thereby continue the application of the first clutch C1.

Step S3-6: The control routine waits until the clutch input side R.P.M. $N_{C1}$ becomes smaller than a constant DEN.

Step S3-7: The control routine awaits the lapse of a time period $T_5$ as measured by a fifth timer (not shown).

In this case, values of the constant $P_{C1s}$, the pressure $P_B$, the set pressure $\Delta P_B$ and so on are set on the basis of variables corresponding to the input torque $T_T$ (FIG. 9) such as the throttle opening $\theta$.

In the foregoing embodiment, the feed of the oil pressure to the hydraulic servo B-2 is started by generating a 2nd speed shift signal at Step S1-4 of FIG. 7, but the oil pressure is not fed to the hydraulic servo B-1 until the oil pressure in the hydraulic servo B-2 rises. This delay, in turn, delays the start and end of the operation of the hydraulic servo B-1.

Figure 17:
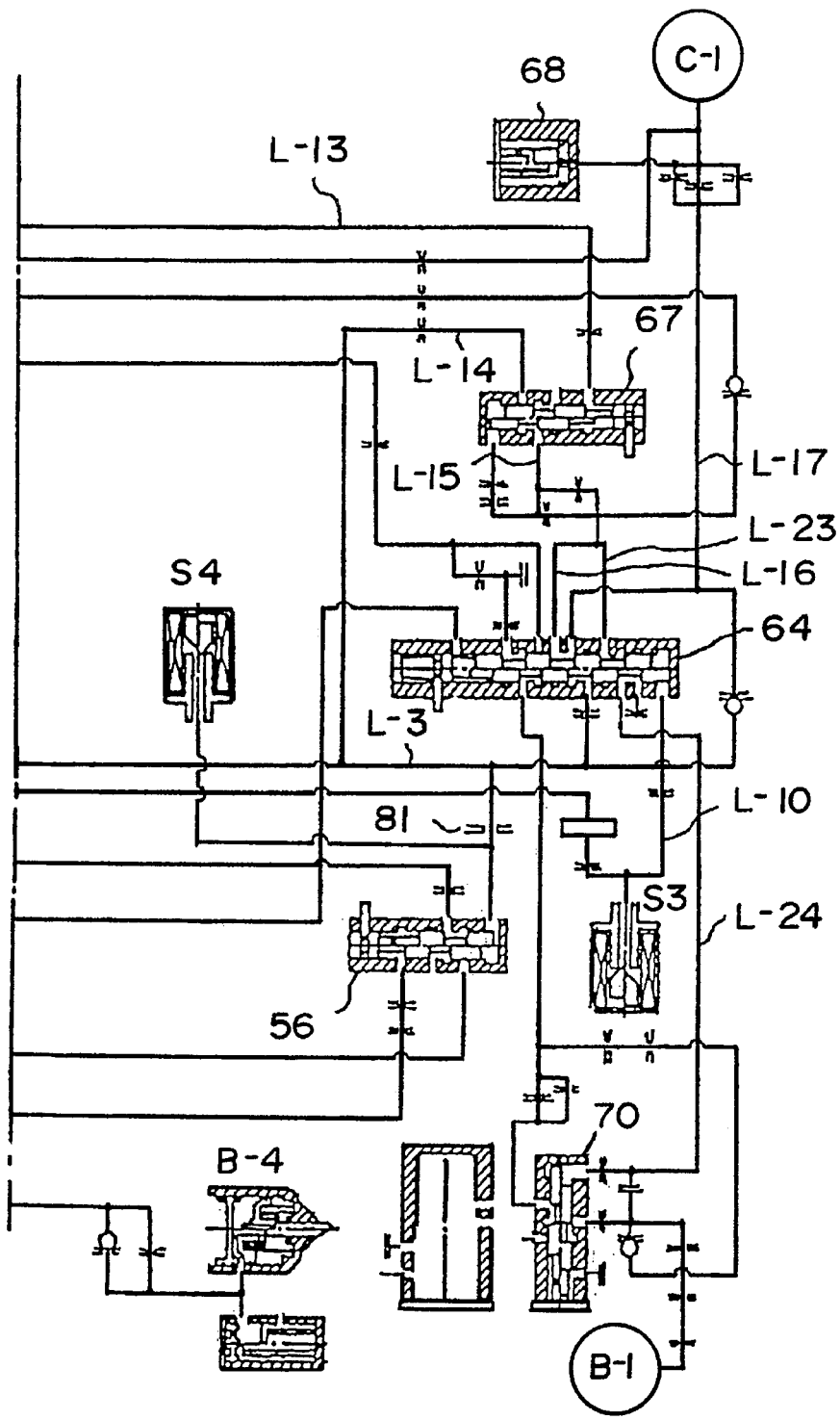
FIG. 17 shows, in combination with FIG. 4, a hydraulic circuit of an automatic transmission according to a second embodiment of the present invention.

A second embodiment, in which the feed of the oil pressure to the hydraulic servo B-1 is started simultaneously with the start of the feed of the oil pressure to the hydraulic servo B2, will now be described with reference to FIGS. 17–20. FIG. 17 shows a portion of the hydraulic circuit which corresponds to that of FIG. 5. The remaining portion of the hydraulic circuit has the same structure as that of FIG. 4, and its description will therefore be omitted. Moreover, the portions of FIG. 17 having the same structure as in FIG. 5 will not be further described. Likewise, the portions of FIG. 20 having the same structure as in FIG. 16 will not be further described.

As shown in FIG. 17, the B-1 sequence valve 56 has a spring at its left end and a control oil chamber at its right end. The spring exerts its load upon the spool, and the control oil chamber applies a control oil pressure to the spool. The control oil chamber is connected to the line L-3 through an orifice 81 and to a fourth solenoid valve S4 at the near side of the orifice 81.

In 1st speed the B-1 sequence valve 56 receives the D-range pressure at its control oil chamber via the line L-3 so that it moves to the lower half position. When the fourth solenoid valve S4 is opened at 2nd speed, the spool is released from the control oil pressure and is pushed to the right by the spring load so that the B-1 solenoid valve 56 takes the upper half position. As a result, the oil pressure from the 1-2 shift valve 57 is fed through the B-1 solenoid valve 56 to the 3-4 shift valve 62 and further through the 1-2 shift valve 57 and the neutral relay valve 64 to the hydraulic servo B-1. Thus, the oil pressure is fed to the hydraulic servo 13-1 as the fourth solenoid valve S4 is opened.

As a result, at the 2nd speed, the oil pressure is fed simultaneously to the hydraulic servo B-2 and the hydraulic servo B-1 so that the oil pressure rises.

Figure 18:
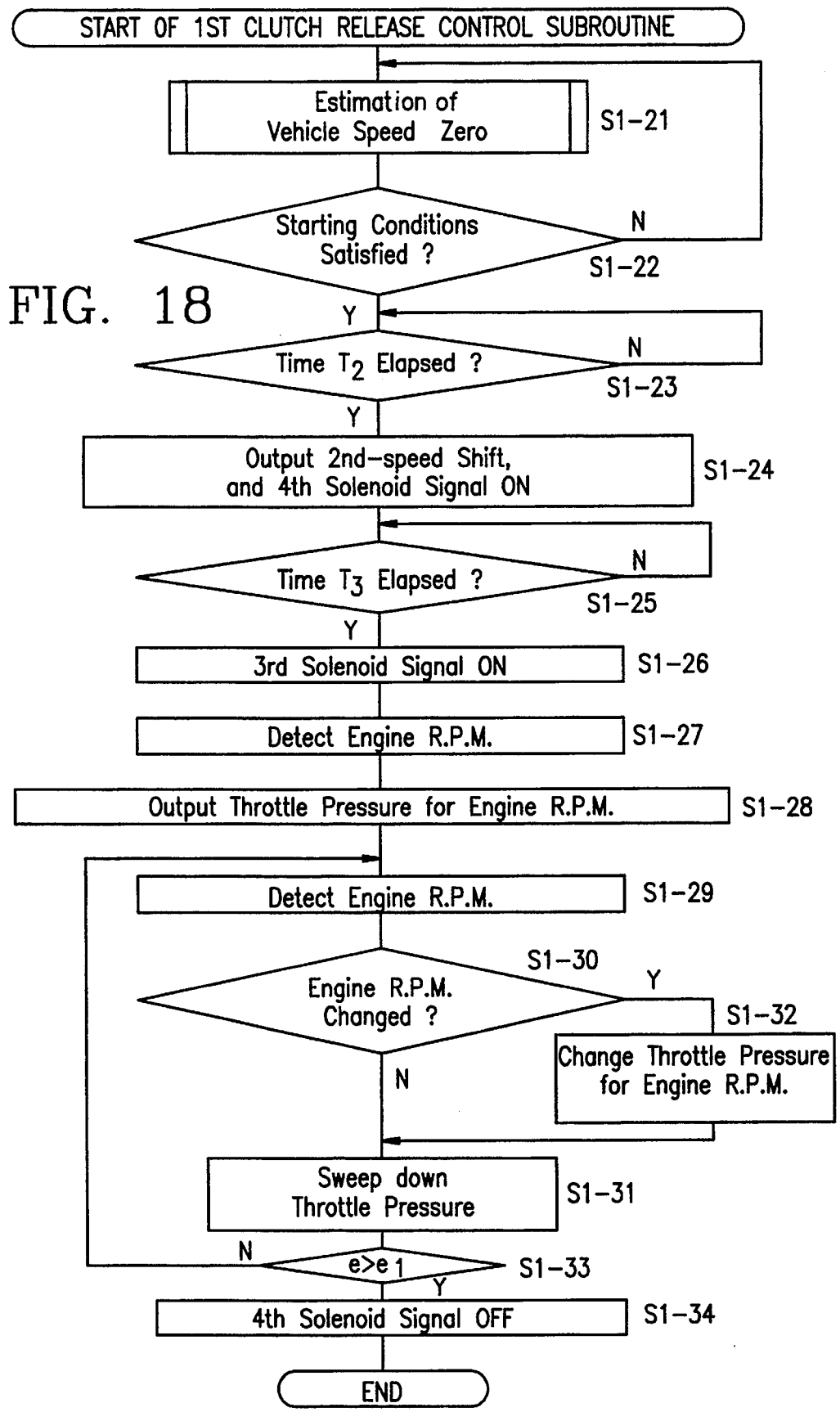
FIG. 18 is a flow chart of a first clutch release control subroutine in the second embodiment of the present invention.
Figure 19:
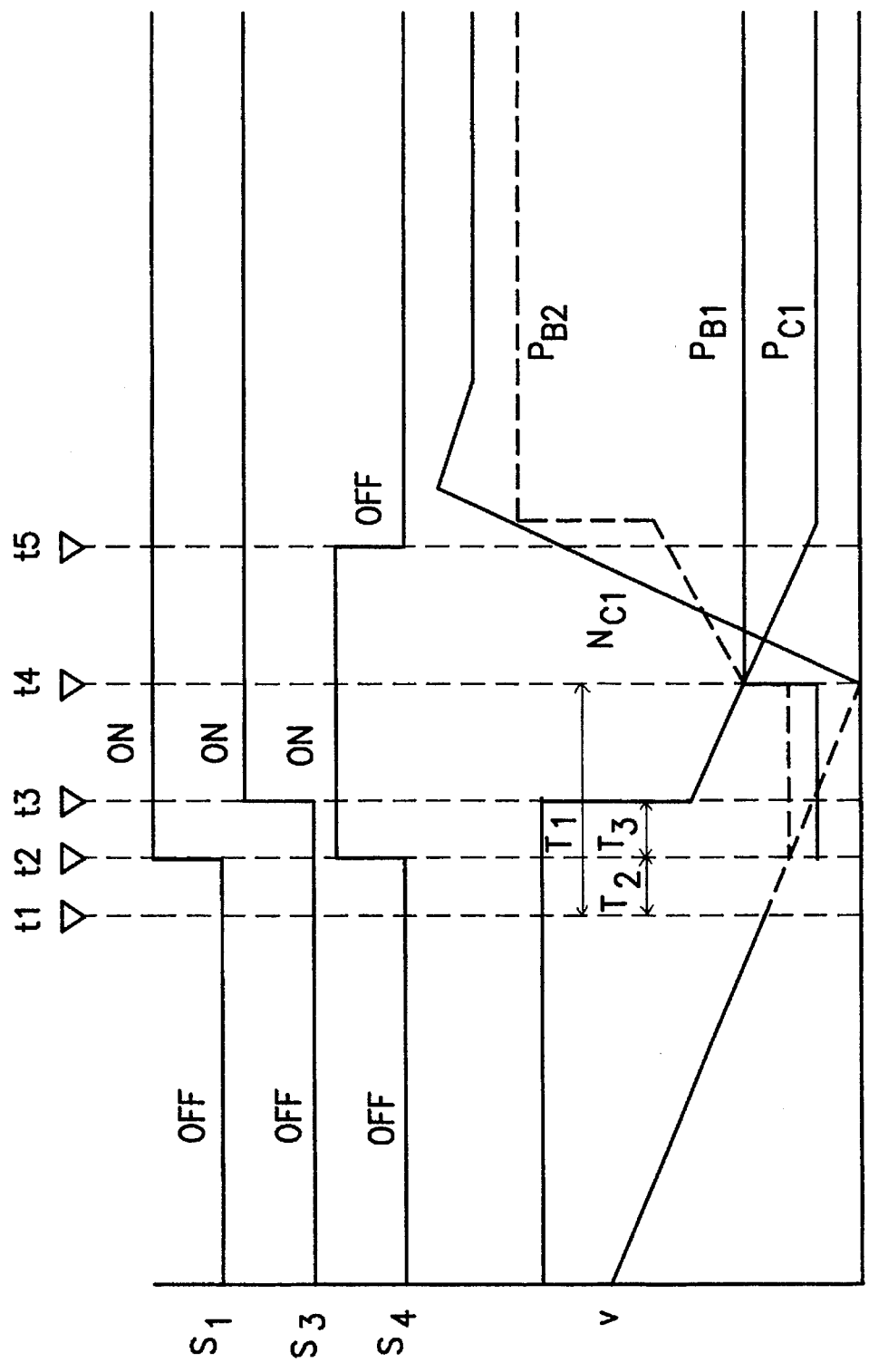
FIG. 19 is a time chart of operations in the first clutch release control subroutine in the second embodiment of the present invention.
Figure 20:
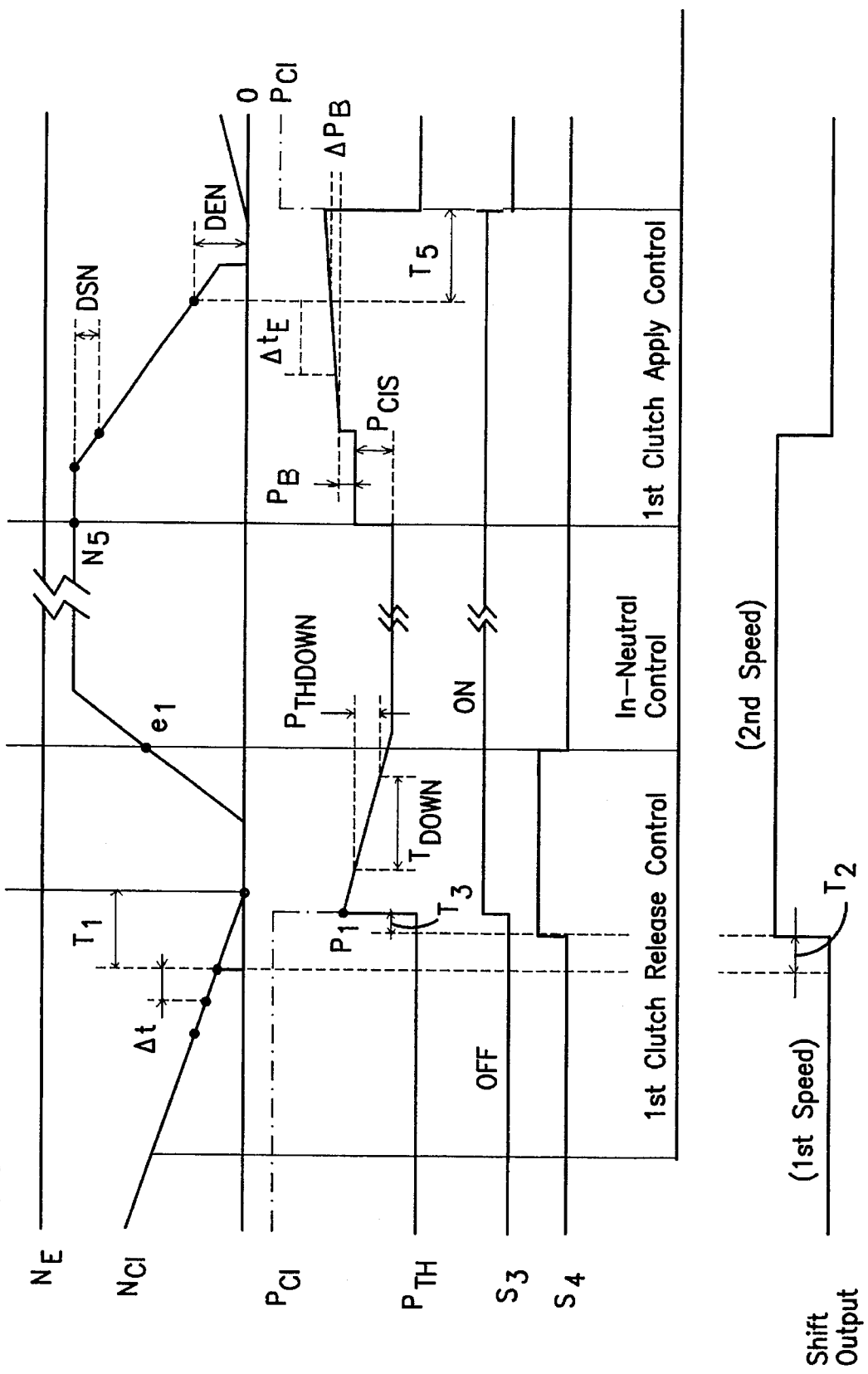
FIG. 20 is a time chart of operations of the automatic transmission control system of the second embodiment of the present invention.

The first clutch release control subroutine for the second embodiment will now be described with reference to FIGS. 18 and 19. In FIG. 19: $S_1$ designates a first solenoid signal for opening/closing the first solenoid valve S1; $S_3$ is a third solenoid signal for opening/closing the third solenoid valve S3; $S_4$ is a fourth solenoid signal for opening/closing the fourth solenoid valve S4; $P_{C1}$ is the C-1 oil pressure fed to the hydraulic servo C-1; "v" is the vehicle speed; $P_{B1}$ is the oil pressure fed to the hydraulic servo B-1; $P_{B2}$ is the oil pressure fed to the hydraulic servo B-2; $N_{C1}$ is the clutch input side R.P.M.; and $T_1$ to $T_3$ are the time periods timed by the first to third timers, respectively.

Step S1-21: The vehicle speed zero estimation is executed on the basis of the change in the clutch input side R.P.M. $N_{C1}$.

Step S1-22: The routine awaits satisfaction of the conditions for starting the hill-hold control and the neutral control. If the starting conditions are satisfied at the time t1 shown in FIG. 19, timing operations of the first and second timers are started, and the subroutine advances to Step S1-23. In this case, the satisfaction of the starting conditions is decided if all the following conditions are satisfied: the clutch input side R.P.M. $N_{C1}$ is substantially 0; the accelerator pedal (not shown) is released so that the throttle opening θ is below a predetermined value; the oil temperature detected by the oil temperature sensor 46 (FIG. 2) is over a predetermined value; and the brake pedal is engaged to turn ON the brake switch 48. Incidentally, whether or not the clutch input side R.P.M. $N_{C1}$ is substantially 0 is decided on the basis of whether or not a limit value is detected by the R.P.M. sensor 47. In the present embodiment, the limit value corresponds to an actual vehicle of 2 km/h.

Step S1-23: The control routine awaits lapse of a time period $T_2$, as determined by the second timer, and the subroutine advances to Step S1-24 upon lapse of the time period $T_2$. Here, the time period $T_2$ is calculated by subtracting the piston stroke time period (e.g., about 0.4 secs in the present embodiment) of the hydraulic servo B-2, from the time period $T_1$ which is calculated by the speed zero estimation.

Step S1-24: The hill-hold control is started. Specifically, the 2nd speed shift output signal is issued at time t2, and the first solenoid signal $S_1$ for opening/closing the first solenoid valve S1 is turned ON to start the feed of oil pressure to the hydraulic servo B-2 of the second brake B2. At this time, moreover, the fourth solenoid valve S4 is turned ON to start the feed of the oil pressure to the hydraulic servo B-1 of the first brake B1 and the timing operation of the third timer (not-shown).

Step S1-25: Lapse of the time period $T_3$, as determined by operation of the third timer, is awaited, and the subroutine advances to Step S1-26 upon lapse of time period $T_3$. In this case, the time period $T_3$ is set to the difference which is calculated by subtracting a delay time period t2 from the piston stroke time period t1, wherein: the time period t1 is the time of the piston stroke in hydraulic servo B-1 and the delay time period t2 is the time period beginning with the third solenoid signal $S_3$ and ending with initiation of transition of the first clutch C1 from the applied state to the slipping state at time t4. The time period $T_3$ is preferably changed according to the temperature of the oil because both the piston stroke time period t1 and the delay time period t2 vary depending upon the viscosity of the oil. The fourth solenoid valve $S_4$ is turned OFF at the time t5. However, the fourth solenoid signal $S_4$ could be turned OFF at time t4 and remain OFF thereafter.

Step S1-26: At t3 the third solenoid signal $S_3$ for opening/closing the third solenoid valve S3 is turned ON to switch the neutral relay valve 64 to the upper half position to allow for control of the C-1 oil pressure $P_{C1}$.

Step S1-27: As shown in FIG. 9, the engine R.P.M. $N_E$ corresponding to the input torque $T_T$ is detected, and a reference engine R.P.M. $N_{Em}$ is set with the value for the engine R.P.M. $N_E$.

Step S1-28: The throttle pressure $P_{TH}$ just before the start of the release of the first clutch C1 is determined to correspond to the engine R.P.M. $N_E$ and is set as the set oil pressure $P_1$, and the C-1 oil pressure $P_{C1}$ is reduced to the set oil pressure $P_1$.

Step S1-29: The engine R.P.M. $N_E$ corresponding to the input torque $T_T$ is again detected.

Step S1-30: It is decided whether or not the engine R.P.M. $N_E$ has been changed with reference to the reference engine R.P.M. $N_{Em}$. The subroutine advances to Step S1-31, if not changed, but to Step S1-32 if changed.

Step S1-31: The throttle pressure $P_{TH}$, i.e., the C-1 oil pressure $P_{C1}$ is lowered (or swept down) by set increments of pressure $P_{TH}$DOWN at the end of each of successive set time period TDOWN, as expressed by the foregoing Equation (1).

Meanwhile, the feeds of oil pressure to the hydraulic servo B-2 and the hydraulic servo B-1 are continued, and the piston strokes of the hydraulic servo B-2 and the hydraulic servo B-1 are ended at time t4 to start the applications of the second brake B2 and the first brake B1. As a result, the hill-hold control is effective until the slipping engagement of the first clutch C1 is started at time t4.

Step S1-32: The value of the engine R.P.M. $N_E$ is set as the reference engine R.P.M. $N_{Em}$, at the instant when it is decided in Step S1-30 that $N_E$ has changed relative to the reference engine R.P.M. $N_{Em}$. Also, the C-1 oil pressure $P_{C1}$ is changed to the throttle pressure $P_{TH}$ corresponding to the new reference engine R.P.M. $N_{Em}$.

Step S1-33: After the first clutch C1 starts to slip, the routine returns to Step S1-29 until the following speed ratio e exceeds a constant $e_1$:

$$e = N_{C1}/N_E.$$

This pressure reduction of Step S1-31 is stopped, and the subroutine advances to Step S1-34, when the speed ratio e exceeds the constant $e_1$. This constant $e_1$ is set to 0.75, for example, in consideration of the delay of the change of the clutch input side R.P.M. $N_{C1}$ as the oil pressure to the first clutch C1 servo is released. Incidentally, the speed ratio e may be replaced by the clutch input side R.P.M. $N_{C1}$.

Step S1-34: The fourth solenoid signal $S_4$ is turned OFF at time t5.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A control system for an automatic transmission, the automatic transmission including a speed change unit with an output shaft and a fluid transmission unit for transmitting the rotation of an engine to the speed change unit, said control system comprising:

a clutch which is applied responsive to selection of a forward running range;

a one-way clutch which becomes locked when said clutch is applied, to establish a forward first speed;

a brake for locking said one-way clutch to prevent reverse rotation of the output shaft of the speed change unit;

a first hydraulic servo including a first piston for applying said clutch by a piston stroke responsive to receipt of an oil pressure;

a second hydraulic servo including a second piston for applying said brake by a piston stroke responsive to receipt of an oil pressure; and a control unit for controlling the oil pressures fed to said first hydraulic servo, said control unit comprising:

oil pressure feed means for feeding oil pressure to said second hydraulic servo responsive to selection of a forward running range, provided the vehicle is substantially stopped, the engine is idling and the foot brake is engaged; and pressure reducing means for starting reduction of the oil pressure in said first hydraulic servo upon expiration of a set time period to start transition of the clutch from the applied state to the slipping state, at or after completion of the piston stroke of said second hydraulic servo.

2. A control system for an automatic transmission according to claim 1, wherein said set time period is a predetermined time period beginning with initiation of feed of the oil pressure to said second hydraulic servo by said oil pressure feed means.

3. A control system for an automatic transmission according to claim 2, wherein said predetermined time period is changed according to the oil temperature.

4. A control system for an automatic transmission according to claim 1, wherein said pressure reducing means releases said clutch after the transition of said clutch from the applied state to the slipping state has started.

5. A control system for an automatic transmission, the automatic transmission including a speed change unit with an output shaft and a fluid transmission unit for transmitting the rotation of an engine to the speed change unit, said control system comprising:

a clutch which is applied responsive to selection of a forward running range;

a one-way clutch which becomes locked when said clutch is applied, to establish a forward first speed;

a brake for locking said one-way clutch to prevent reverse rotation of the output shaft of said speed change unit;

a first hydraulic servo including a first piston for applying said clutch by a piston stroke responsive to receipt of an oil pressure;

a second hydraulic servo including a second piston for applying said brake by a piston stroke responsive to receipt of an oil pressure;

a vehicle speed corresponding value sensor for detecting a vehicle speed corresponding value which changes in a manner corresponding to change in the vehicle speed; and a control unit for controlling the oil pressures fed to said first hydraulic servo and said second hydraulic servo, said control unit comprising:

vehicle speed corresponding value decision means for deciding whether or not said vehicle speed corresponding value has reached a set value;

deceleration calculation means for calculating the deceleration of the vehicle on the basis of the vehicle speed corresponding value at a set time prior to having reached said set value;

vehicle stop estimation means for estimating a first time period for the vehicle to stop on the basis of the calculated deceleration, responsive to a decision that said vehicle speed corresponding value has reached said set value;

oil pressure feed means for starting the feed of oil pressure to said second hydraulic servo, upon expiration of a set second time period, responsive to selection of a forward running range, provided the engine is idling and a foot brake is engaged, and for ending the piston stroke of said second hydraulic servo upon expiration of said first time period; and pressure reducing means for starting reduction of the pressure of said first hydraulic servo upon expiration of a third time period to start transition of the clutch from the applied state to the slipping state at or after completion of the piston stroke of said second hydraulic servo.

6. A control system for an automatic transmission according to claim 3, wherein said third time period is a predetermined time period beginning with initiation of the feed of the oil pressure to said second hydraulic servo by said oil pressure feed means.

7. A control system for an automatic transmission according to claim 2, wherein said predetermined time period is changed according to the oil temperature.

8. A control system for an automatic transmission according to claim 5, wherein said pressure reducing means releases said clutch after the transition of said clutch from the applied state to the slipping state has started.

9. A control system for an automatic transmission, the automatic transmission including a speed change unit having a plurality of speed change members and an output shaft and a fluid transmission unit for transmitting the rotation of an engine to the speed change unit, said control system comprising:

a clutch which is applied responsive to selection of a forward running range;

a first one-way clutch which becomes locked when said clutch is applied, to establish a forward first speed;

a first brake for locking said one-way clutch to prevent reverse rotation of the output shaft of said speed change unit and for braking one of said speed change members at forward 2nd and higher speeds;

a second brake, arranged in parallel with said first brake, for braking said one speed change member through a second one-way clutch;

a first hydraulic servo for applying said clutch responsive to receipt of an oil pressure;

a second hydraulic servo for applying said first brake by a piston stroke responsive to receipt of an oil pressure;

a third hydraulic servo for applying said second brake by a piston stroke responsive to receipt of an oil pressure;

a vehicle speed corresponding value sensor for detecting a vehicle speed corresponding value which changes in a manner corresponding to the vehicle speed; and a control unit for controlling the oil pressures fed to said first, second and third hydraulic servos, said control unit comprising:
   vehicle speed corresponding value decision means for deciding whether or not said vehicle speed corresponding value has reached a set value;
   deceleration calculation means for calculating the deceleration of the vehicle on the basis of the vehicle speed corresponding value at a set time prior to having reached said set value;
   vehicle stop estimation means for estimating a first time period for the vehicle to stop on the basis of the calculated deceleration, responsive to a decision that said vehicle speed corresponding value has reached said set value;
   oil pressure feed means for starting the feed of the oil pressure to said third hydraulic servo, upon expiration of a set second time period, responsive to selection of a forward running range provided the engine is idling and a foot brake is engaged, and for ending the piston stroke of said third hydraulic servo upon expiration of said first time period;
   a sequence valve switched responsive to a rise of the oil pressure of said third hydraulic servo to start the feed of the oil pressure to said second hydraulic servo upon expiration of a third time period during which the piston stroke of said third hydraulic servo ends; and
   pressure reducing means for starting reduction of the pressure of said first hydraulic servo upon expiration of a fourth time period to start transition of the clutch from the applied state to the slipping state of said clutch at or after completion of the piston stroke of said second hydraulic servo.

10. A control system for an automatic transmission according to claim 5,
   wherein said fourth time period is a predetermined time period beginning with initiation of the feed of the oil pressure to said third hydraulic servo by said oil pressure feed means.

11. A control system for an automatic transmission according to claim 10, wherein said predetermined time period is changed according to the oil temperature.

12. A control system for an automatic transmission according to claim 9, wherein said pressure reducing means releases said clutch after the transition of said clutch from the applied state to the slipping state has started.

13. A control system for an automatic transmission, the automatic transmission including a speed change unit having a plurality of speed change members and an output shaft and a fluid transmission unit for transmitting the rotation of an engine to the speed change unit, said control system comprising:
   a clutch which is applied responsive to selection of a forward running range;
   a first one-way clutch which becomes locked when said clutch is applied, to establish a forward first speed;
   a first brake for locking said one-way clutch to prevent reverse rotation of the output shaft of said speed change unit, and for braking one of said speed change members at forward 2nd and higher speeds;
   a second brake, arranged in parallel with said first brake, for braking said one speed change member through a second one-way clutch;
   a first hydraulic servo for applying said clutch responsive to receipt of an oil pressure;
   a second hydraulic servo for applying said first brake by a piston stroke responsive to receipt of an oil pressure;
   a third hydraulic servo for applying said second brake by a piston stroke responsive to receipt of an oil pressure;
   a vehicle speed corresponding value sensor for detecting a vehicle speed corresponding value which changes in a manner corresponding to the vehicle speed; and
   a control unit for controlling the oil pressures fed to said first, second and third hydraulic servos, said control unit comprising:
      vehicle speed corresponding value decision means for deciding whether or not said vehicle speed corresponding value has reached a set value;
      deceleration calculation means for calculating the deceleration of the vehicle on the basis of the vehicle speed corresponding value at a set time prior to having reached said set value;
      vehicle stop estimation means for estimating a first time period for the vehicle to stop on the basis of said deceleration, responsive to a decision that said vehicle speed corresponding value has reached said set value;
      oil pressure feed means for starting the feeds of the oil pressures to said second hydraulic servo and said third hydraulic servo, upon expiration of a set second time period, responsive to selection of a forward running range, provided the engine is idling and a foot brake is engaged, and for ending the piston strokes of said second hydraulic servo and said third hydraulic servo upon expiration of said first time period; and
      pressure reducing means for starting reduction of the pressure of said first hydraulic servo upon expiration of a third time period to start the transition of the clutch from the applied state to the slipping state at or after completion of the the piston strokes of said second hydraulic servo and said third hydraulic servo.

14. A control system for an automatic transmission according to claim 7,
   wherein said third time period is a predetermined time period beginning with initiation of the feed of the oil pressure to said third hydraulic servo by said oil pressure feed means.

15. A control system for an automatic transmission according to claim 14, wherein said predetermined time period is changed according to the oil temperature.

16. A control system for an automatic transmission according to claim 13, wherein said pressure reducing means releases said clutch after the transition of said clutch from the applied state to the slipping state has started.

* * * * *

UNITED STATES PATENT AND TRADEMARK OFFICE
CERTIFICATE OF CORRECTION

PATENT NO. : 5,586,954
DATED : December 24, 1996
INVENTOR(S) : IWATA et al

It is certified that error appears in the above-indentified patent and that said Letters Patent is hereby corrected as shown below:

Col. 22, line 29, "3" should read --5--; and
       line 34, "2" should read --6--.

Col. 23, line 36, "5" should read --9--.

Col. 24, line 46, "7" should read --13--.

Signed and Sealed this

Thirtieth Day of September, 1997

Attest:

BRUCE LEHMAN

Attesting Officer     Commissioner of Patents and Trademarks